(12) United States Patent
    Wang

(10) Patent No.: US 12,401,808 B2
(45) Date of Patent: *Aug. 26, 2025

(54) TECHNIQUES FOR IMPLEMENTING A DECODING ORDER WITHIN A CODED PICTURE

(71) Applicant: Bytedance Inc., Los Angeles, CA (US)

(72) Inventor: Ye-Kui Wang, San Diego, CA (US)

(73) Assignee: Bytedance Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,803

(22) Filed: Apr. 3, 2023

(65) Prior Publication Data
US 2023/0239483 A1    Jul. 27, 2023

Related U.S. Application Data

(63) Continuation of application No. 17/838,522, filed on Jun. 13, 2022, now Pat. No. 11,641,477, which is a
(Continued)

(51) Int. Cl.
*H04N 19/30*    (2014.01)
*H04N 19/169*    (2014.01)
(Continued)

(52) U.S. Cl.
CPC ........... *H04N 19/30* (2014.11); *H04N 19/174* (2014.11); *H04N 19/188* (2014.11); *H04N 19/70* (2014.11)

(58) Field of Classification Search
CPC .... H04N 19/30; H04N 19/174; H04N 19/188; H04N 19/70
See application file for complete search history.

(56) References Cited

U.S. PATENT DOCUMENTS

| 8,107,744 B2 | 1/2012 | Tian |
| 9,106,927 B2 | 8/2015 | Wang |

(Continued)

FOREIGN PATENT DOCUMENTS

| CN | 104160702 A | 11/2014 |
| CN | 106105225 A | 11/2016 |

(Continued)

OTHER PUBLICATIONS

Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019.

(Continued)

*Primary Examiner* — Jae N Noh
(74) *Attorney, Agent, or Firm* — Conley Rose, P.C.

(57) ABSTRACT

A method for video processing is described. The method includes performing a conversion between a video including one or more pictures including one or more subpictures including one or more slices and a bitstream representation of the video according to a rule, and wherein the bitstream representation includes a number of coded units, wherein the rule specifies that a decoding order of coded units within a subpicture is in an increasing order of subpicture level slice index values of the coded units.

20 Claims, 11 Drawing Sheets

Related U.S. Application Data continuation of application No. PCT/US2020/066356, filed on Dec. 21, 2020.

(60) Provisional application No. 62/954,375, filed on Dec. 27, 2019, provisional application No. 62/953,812, filed on Dec. 26, 2019.

(51) Int. Cl.
*H04N 19/174* (2014.01)
*H04N 19/70* (2014.01)

(56) References Cited

U.S. PATENT DOCUMENTS

| | | |
|---|---|---|
| 9,264,717 B2 | 2/2016 | Chen |
| 9,350,781 B2 | 5/2016 | Coban |
| 9,374,581 B2 | 6/2016 | Wang |
| 9,479,773 B2 | 10/2016 | Wang |
| 9,491,456 B2 | 11/2016 | Wang |
| 9,571,847 B2 | 2/2017 | Wang |
| 9,641,834 B2 | 5/2017 | Wang |
| 9,667,959 B2 | 5/2017 | Wang |
| 9,723,305 B2 | 8/2017 | Wang |
| 9,854,270 B2 | 12/2017 | Ramasubramonian |
| 9,866,851 B2 | 1/2018 | Hendry |
| 9,866,852 B2 | 1/2018 | Ramasubramonian |
| 9,979,958 B2 | 5/2018 | Wang |
| 9,979,971 B2 | 5/2018 | Ramasubramonian |
| 10,404,990 B2 | 9/2019 | Hendry |
| 10,652,631 B2 | 5/2020 | Wang |
| 2004/0218816 A1 | 11/2004 | Hannuksela |
| 2005/0254526 A1 | 11/2005 | Wang |
| 2007/0014346 A1 | 1/2007 | Wang |
| 2008/0225763 A1 | 9/2008 | Prasad |
| 2010/0049865 A1 | 2/2010 | Hannuksela |
| 2013/0287093 A1 | 10/2013 | Hannuksela |
| 2014/0093179 A1 | 4/2014 | Deshpande |
| 2015/0103886 A1 | 4/2015 | He |
| 2015/0103887 A1 | 4/2015 | Ramasubramonian |
| 2015/0117547 A1 | 4/2015 | Zhao |
| 2015/0271529 A1 | 9/2015 | Wang |
| 2015/0373350 A1 | 12/2015 | Hendry |
| 2016/0165237 A1 | 6/2016 | Chen |
| 2016/0234526 A1 | 8/2016 | Wang |
| 2019/0058895 A1 | 2/2019 | Deshpande |
| 2021/0185342 A1 | 6/2021 | Zhang |
| 2021/0409690 A1 | 12/2021 | Hendry |
| 2022/0021896 A1 | 1/2022 | Hendry |
| 2022/0060693 A1 | 2/2022 | Wang |
| 2022/0103867 A1 | 3/2022 | Wang |
| 2022/0132148 A1 | 4/2022 | Wang |
| 2022/0159245 A1 | 5/2022 | Wang |
| 2022/0166970 A1 | 5/2022 | Wang |
| 2022/0217388 A1 | 7/2022 | Wang |

FOREIGN PATENT DOCUMENTS

| | | | | |
|---|---|---|---|---|
| JP | 7405990 B2 | 12/2023 | | |
| WO | WO-2021126044 A1 * | 6/2021 | ........... | H04N 19/119 |
| WO | WO-2021133721 A1 * | 7/2021 | ........... | H04N 19/119 |

OTHER PUBLICATIONS

ITU-T H.265 "High efficiency video coding" Series H: Audiovisual and Multimedia Systems Infrastructure of audiovisual services—Coding of moving video, Telecommunicationstandardization Sectorof ITU (Nov. 2019).

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "Algorithm Description for Versatile Video Coding and Test Model 7 (VTM 7)," Joint Video Experts Team JVET) of ITU-T SG 16 WP 3 and ISO/IEC JTC 1/SC 29/WG 11 16th Meeting: Geneva, CH, Oct. 1-11, 2019, document JVET-P2002, 2019.

VTM software: https://vcgit.hhi.fraunhofer.de/jvet/VVCSoftware_VTM.git, Aug. 23, 2022.

Boyce et al. HEVC Additional Supplemental Enhancement Information (Draft 4), Joint Collaborative Team on Video Coding (JCT-VG) of ITU-T SG 16 WP 3 and ISO/IEC JTC 1/SC 29/WG 11 29th Meeting: Macao, CN, Oct. 19-25, 2017 document JCTVC-AC1005, 2017.

Schwarz et al. "Overview of the scalable video coding extension of the H. 264/AVC standard." IEEE Transactions on circuits and systems for video technology 17.9 (2007): 1103-1120. Sep. 24, 2007 (Sep. 24, 2007) Retrieved on Feb. 18, 2021 (Feb. 18, 2021).

Bross et al. "Versatile Video Coding (Draft 7)," Joint Video Experts Team (JVET) of ITU-T SG 16 WP 3 and 1SO/IEC JTC 1/SC 29/WG 11 16th Meeting: Geneva, CH, Oct. 1-11, 2019, document JVET-P2001 v9, 2019.

Skupin et al. "AHG 17: On Simplification of Subpicture Design," Joint Video Experts Team (JVET) of ITU-T SG 16 WP 3 and ISO/IEC JTC 29/WG 11 16th Meeting, Geneva, CH, Oct. 1-11, 2019, document JVET-P0480, 2019.

Sjoberg et al. "AHG12: On Slice Address Signaling," Joint Video Experts Team (JVET) of ITU-T SG 16 WP 3 and ISO/IEC JTC 29/WG 11 16th Meeting, Geneva, CH, Oct. 1-11, 2019, document JVET-P0609, 2019.

Sjoberg et al. "Overview of HEVC High-Level Syntax and Reference Picture Management," IEEE Transactions on Circuits and Systems for Video Technology, 22(12): 1-14, Oct. 2012.

Bross et al. "Versatile Video Coding (Draft 6)," Joint Video Experts Team (JVET)of ITU-T SG 16 WP 3 and ISO/IEC JTC 1/SC 29/WG 1115th Meeting: Gothenburg, SE, Jul. 3-12, 2019, document JVET-O2001, 2019.

Extended European Search Report from European Patent Application No. 20905915.3 dated Dec. 21, 2022 (6 pages).

Communication Pursuant to Article 94(3) EPC from European Patent Application No. 20905915.3 dated Jan. 9, 2023 (8 pages).

Examination Report from Indian Patent Application No. 202227034629 dated Nov. 2, 2022 (6 pages).

International Search Report and Written Opinion from International Patent Application No. PCT/US2020/066356 dated Mar. 31, 2021 (3 pages).

Notice of Allowance dated Dec. 21, 2022, 17 pages, U.S. Appl. No. 17/838,522, filed Jun. 13, 2022.

Non-Final Office Action dated Aug. 17, 2022, 10 pages, U.S. Appl. No. 17/838,522, filed Jun. 13, 2022.

Document: JVET-Q0044-v1, Nishi, T., et al., "AHG9/AHG12: Simplification of slice index with subpictures," Joint Video Experts Team (JVET) of ITU-T SG 16 WP 3 and ISO/IEC JTC1/SC 29/WG 11, 17th Meeting: Brussels, BE, Jan. 7-17, 2020, 3 pages.

Decision of Refusal for Japanese Application No. 2023-202894, mailed Mar. 5, 2025, 7 pages.

Notification to Grant Patent Right for Invention for Chinese Patent Application No. 202080090631.0, mailed on Mar. 27, 2025, 8 pages.

Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.

Document: JVET-P0480-v2, Skupin, R., et al., "AHG 17: On simplification of subpicture design," Joint Video Experts Team (JVET) of ITU-T SG 16 WP 3 and ISO/IEC JTC 1/SC 29/WG 11 16th Meeting: Geneva, CH, Oct. 1-11, 2019, 6 pages.

Singapore Office Action from Singapore Patent Application No. 11202250467F dated Jun. 18, 2025, 10 pages.

* cited by examiner

TECHNIQUES FOR IMPLEMENTING A DECODING ORDER WITHIN A CODED PICTURE

CROSS-REFERENCE TO RELATED APPLICATION

This application is a continuation of U.S. application Ser. No. 17/838,522, filed on Jun. 13, 2022, which is a continuation of International Patent Application No. PCT/US2020/066356, filed on Dec. 21, 2020, which claims the priority to and benefits of U.S. Provisional Application No. 62/953,812 filed on Dec. 26, 2019 and U.S. Provisional Application No. 62/954,375 filed on Dec. 27, 2019. All the aforementioned patent applications are hereby incorporated by reference in their entireties.

TECHNICAL FIELD

This disclosure is related to video coding techniques, systems and devices.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, which include specifying a decoding order of video coding layer (VCL) network abstraction layer (NAL) units within a coded picture, are described. The described methods may be applied to both the existing video coding standards (e.g., High Efficiency Video Coding (HEVC) and/or Versatile Video Coding (VVC)) and future video coding standards or video codecs.

In one representative aspect, the disclosed technology may be used to provide a method for video processing. This method includes performing a conversion between a video comprising one or more pictures comprising one or more subpictures comprising one or more slices and a bitstream representation of the video according to a rule, and wherein the bitstream representation includes a number of coded units, wherein the rule specifies that a decoding order of coded units within a subpicture is in an increasing order of subpicture level slice index values of the coded units.

In one representative aspect, the disclosed technology may be used to provide a method for video processing. This method includes performing a conversion between a video comprising one or more pictures comprising one or more subpictures comprising one or more slices and a bitstream representation of the video according to a rule, and wherein the bitstream representation includes a number of coded units, wherein the rule specifies that a decoding order of coded units is in an increasing order of subpicture related values of subpictures from the one or more subpictures that include the coded units.

In another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

DETAILED DESCRIPTION

Figure 1:
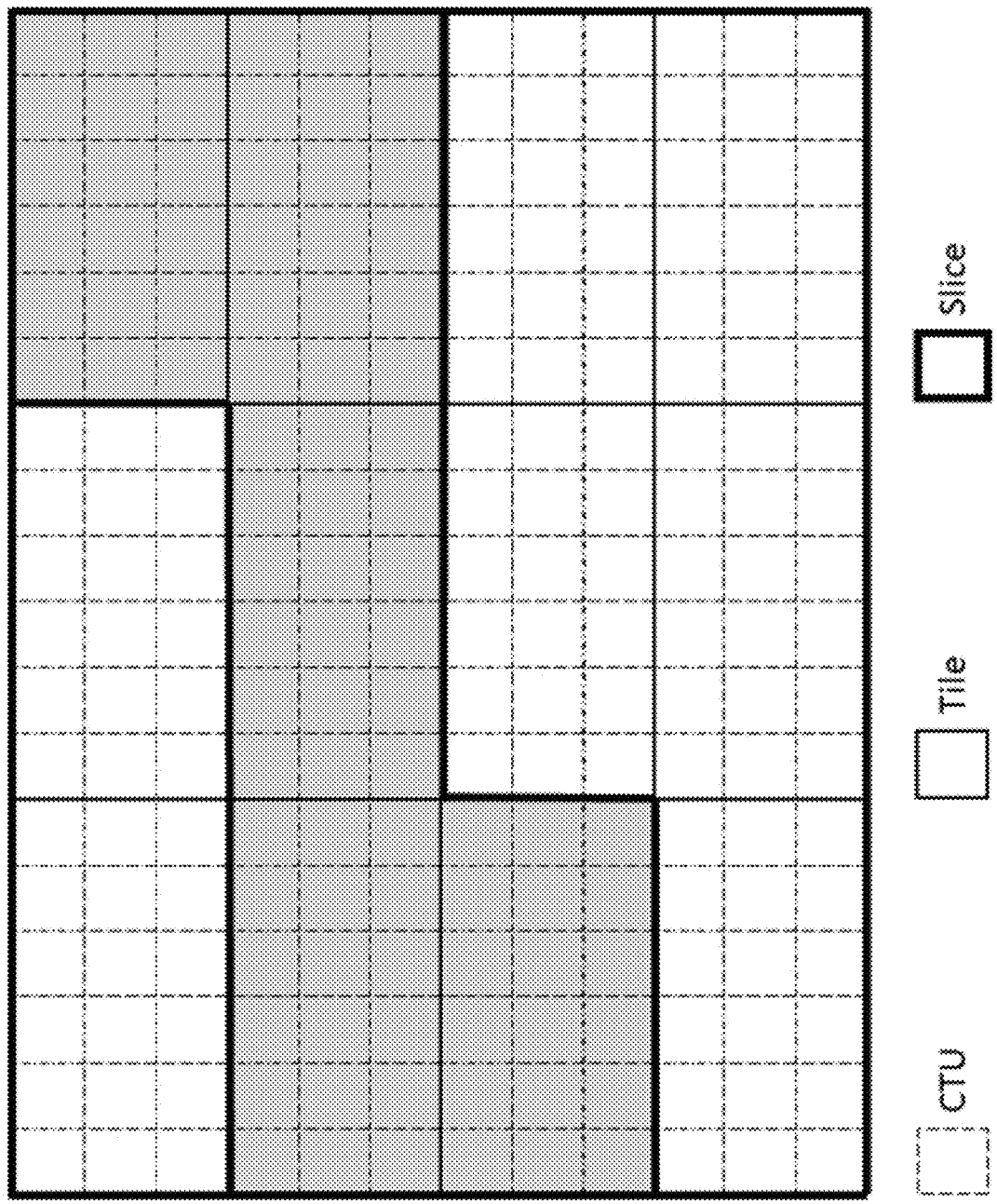
FIG. 1 shows an example of a picture with 18 by 12 luma coding tree units (CTUs) that is partitioned into 12 tiles and 3 raster-scan slices.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding standard to be finalized, or other current and/or future video coding standards.

Embodiments of the disclosed technology may be applied to existing video coding standards (e.g., HEVC, H.265) and future standards to improve runtime performance. It is specifically related to merge modes in video coding. Section headings are used in the present disclosure to improve readability of the description and do not in any way limit the discussion or the embodiments (and/or implementations) to the respective sections only.

1. Summary of Example Embodiments

Embodiments of the disclosed technology are directed to specifying the decoding order of Video Coding Layer (VCL)

Network Abstraction Layer (NAL) units within a coded picture in a coded video bitstream. It may be applied to any video coding standard that supports partitioning of a picture into slices and subpictures, e.g., Versatile Video Coding (VVC) that is being developed, or any other video coding standard or video codec.

2. List of Abbreviations Used in the Present Disclosure

APS Adaptation Parameter Set
AU Access Unit
AUD Access Unit Delimiter
AVC Advanced Video Coding
CLVSS Coded Layer Video Sequence Start
CRA Clean Random Access
CTU Coding Tree Unit
CVS Coded Video Sequence
CVSS Coded Video Sequence Start
DPS Decoding Parameter Set
EOB End Of Bitstream
EOS End Of Sequence
GDR Gradual Decoding Refresh
HEVC High Efficiency Video Coding
IBC Intra Block Copy
IDR Instantaneous Decoding Refresh
IRAP Intra Random Access Point
JEM Joint Exploration Model
MCTS Motion-Constrained Tile Sets
NAL Network Abstraction Layer
PH Picture Header
PPS Picture Parameter Set
PU Picture Unit
RBSP Raw Byte Sequence Payload
SEI Supplemental Enhancement Information
SPS Sequence Parameter Set
VCL Video Coding Layer
VPS Video Parameter Set
VTM VVC Test Model
VUI Video Usability Information
VVC Versatile Video Coding 3. Background Video coding standards have evolved primarily through the development of the well-known International Telecommunication Union-Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, the Joint Video Exploration Team (JVET) was founded by Video Coding Experts Group (VCEG) and MPEG jointly in 2015. Since then, many new methods have been adopted by JVET and put into the reference software named Joint Exploration Model (JEM). The JVET meeting is concurrently held once every quarter, and the new coding standard is targeting at 50% bitrate reduction as compared to HEVC. The new video coding standard was officially named as Versatile Video Coding (VVC) in the April 2018 JVET meeting, and the first version of VVC test model (VTM) was released at that time.

3.1 Picture Partitioning Scheme in HEVC

HEVC includes four different picture partitioning schemes, namely regular slices, dependent slices, tiles, and Wavefront Parallel Processing (WPP), which may be applied for Maximum Transfer Unit (MTU) size matching, parallel processing, and reduced end-to-end delay.

Regular slices are similar as in H.264/AVC. Each regular slice is encapsulated in its own NAL unit, and in-picture prediction (intra sample prediction, motion information prediction, coding mode prediction) and entropy coding dependency across slice boundaries are disabled. Thus a regular slice can be reconstructed independently from other regular slices within the same picture (though there may still have interdependencies due to loop filtering operations).

The regular slice is the only tool that can be used for parallelization that is also available, in virtually identical form, in H.264/AVC. Regular slices based parallelization does not require much inter-processor or inter-core communication (except for inter-processor or inter-core data sharing for motion compensation when decoding a predictively coded picture, which is typically much heavier than inter-processor or inter-core data sharing due to in-picture prediction). However, for the same reason, the use of regular slices can incur substantial coding overhead due to the bit cost of the slice header and due to the lack of prediction across the slice boundaries. Further, regular slices (in contrast to the other tools mentioned below) also serve as the key mechanism for bitstream partitioning to match MTU size requirements, due to the in-picture independence of regular slices and that each regular slice is encapsulated in its own NAL unit. In many cases, the goal of parallelization and the goal of MTU size matching place contradicting demands to the slice layout in a picture. The realization of this situation led to the development of the parallelization tools mentioned below.

Dependent slices have short slice headers and allow partitioning of the bitstream at tree block boundaries without breaking any in-picture prediction. Basically, dependent slices provide fragmentation of regular slices into multiple NAL units, to provide reduced end-to-end delay by allowing a part of a regular slice to be sent out before the encoding of the entire regular slice is finished.

In WPP, the picture is partitioned into single rows of coding tree blocks (CTBs). Entropy decoding and prediction are allowed to use data from CTBs in other partitions. Parallel processing is possible through parallel decoding of CTB rows, where the start of the decoding of a CTB row is delayed by two CTBs, so to ensure that data related to a CTB above and to the right of the subject CTB is available before the subject CTB is being decoded. Using this staggered start (which appears like a wavefront when represented graphically), parallelization is possible with up to as many processors/cores as the picture contains CTB rows. Because in-picture prediction between neighboring tree block rows within a picture is permitted, the required inter-processor/inter-core communication to enable in-picture prediction can be substantial. The WPP partitioning does not result in the production of additional NAL units compared to when it is not applied, thus WPP is not a tool for MTU size matching. However, if MTU size matching is required, regular slices can be used with WPP, with certain coding overhead.

Tiles define horizontal and vertical boundaries that partition a picture into tile columns and rows. A tile column runs from the top of a picture to the bottom of the picture. Likewise, a tile row runs from the left of the picture to the right of the picture. The number of tiles in a picture can be derived simply as number of tile columns multiply by number of tile rows.

The scan order of CTBs is changed to be local within a tile (in the order of a CTB raster scan of a tile), before decoding the top-left CTB of the next tile in the order of tile raster scan of a picture. Similar to regular slices, tiles break in-picture prediction dependencies as well as entropy decoding dependencies. However, they do not need to be included into individual NAL units (same as WPP in this regard); hence tiles cannot be used for MTU size matching. Each tile can be processed by one processor/core, and the inter-processor/inter-core communication required for in-picture prediction between processing units decoding neighboring tiles is limited to conveying the shared slice header in cases a slice is spanning more than one tile, and loop filtering related sharing of reconstructed samples and metadata. When more than one tile or WPP segment is included in a slice, the entry point byte offset for each tile or WPP segment other than the first one in the slice is signaled in the slice header.

For simplicity, restrictions on the application of the four different picture partitioning schemes have been specified in HEVC. A given coded video sequence cannot include both tiles and wavefronts for most of the profiles specified in HEVC. For each slice and tile, either or both of the following conditions must be fulfilled: 1) all coded tree blocks in a slice belong to the same tile; 2) all coded tree blocks in a tile belong to the same slice. Finally, a wavefront segment contains exactly one CTB row, and when WPP is in use, if a slice starts within a CTB row, it must end in the same CTB row.

A recent amendment to HEVC is specified in the JCT-VC output document JCTVC-AC1005, J. Boyce, A. Ramasubramonian, R. Skupin, G. J. Sullivan, A. Tourapis, Y.-K. Wang (editors), "HEVC Additional Supplemental Enhancement Information (Draft 4)," Oct. 24, 2017, publicly available herein: http://phenix.int-evry.fr/jct/doc_end_user/documents/29_Macau/wg11/JCTVC-AC1005-v2.zip. With this amendment included, HEVC specifies three MCTS-related SEI messages, namely temporal MCTSs SEI message, MCTSs extraction information set SEI message, and MCTSs extraction information nesting SEI message.

The temporal MCTSs SEI message indicates existence of MCTSs in the bitstream and signals the MCTSs. For each MCTS, motion vectors are restricted to point to full-sample locations inside the MCTS and to fractional-sample locations that require only full-sample locations inside the MCTS for interpolation, and the usage of motion vector candidates for temporal motion vector prediction derived from blocks outside the MCTS is disallowed. This way, each MCTS may be independently decoded without the existence of tiles not included in the MCTS.

The MCTSs extraction information sets SEI message provides supplemental information that can be used in the MCTS sub-bitstream extraction (specified as part of the semantics of the SEI message) to generate a conforming bitstream for an MCTS set. The information consists of a number of extraction information sets, each defining a number of MCTS sets and containing RBSP bytes of the replacement VPSs, SPSs, and PPSs to be used during the MCTS sub-bitstream extraction process. When extracting a sub-bitstream according to the MCTS sub-bitstream extraction process, parameter sets (VPSs, SPSs, and PPSs) need to be rewritten or replaced, slice headers need to be slightly updated because one or all of the slice address related syntax elements (including first_slice_segment_in_pic_flag and slice_segment_address) typically would need to have different values.

3.2 Partitioning of Picture in VVC

In VVC, a picture is divided into one or more tile rows and one or more tile columns. A tile is a sequence of CTUs that covers a rectangular region of a picture. The CTUs in a tile are scanned in raster scan order within that tile.

A slice consists of an integer number of complete tiles or an integer number of consecutive complete CTU rows within a tile of a picture.

Two modes of slices are supported, namely the raster-scan slice mode and the rectangular slice mode. In the raster-scan slice mode, a slice contains a sequence of complete tiles in a tile raster scan of a picture. In the rectangular slice mode, a slice contains either a number of complete tiles that collectively form a rectangular region of the picture or a number of consecutive complete CTU rows of one tile that collectively form a rectangular region of the picture. Tiles within a rectangular slice are scanned in tile raster scan order within the rectangular region corresponding to that slice.

A subpicture contains one or more slices that collectively cover a rectangular region of a picture.

FIG. 1 shows an example of raster-scan slice partitioning of a picture, where the picture is divided into 12 tiles and 3 raster-scan slices.

Figure 2:
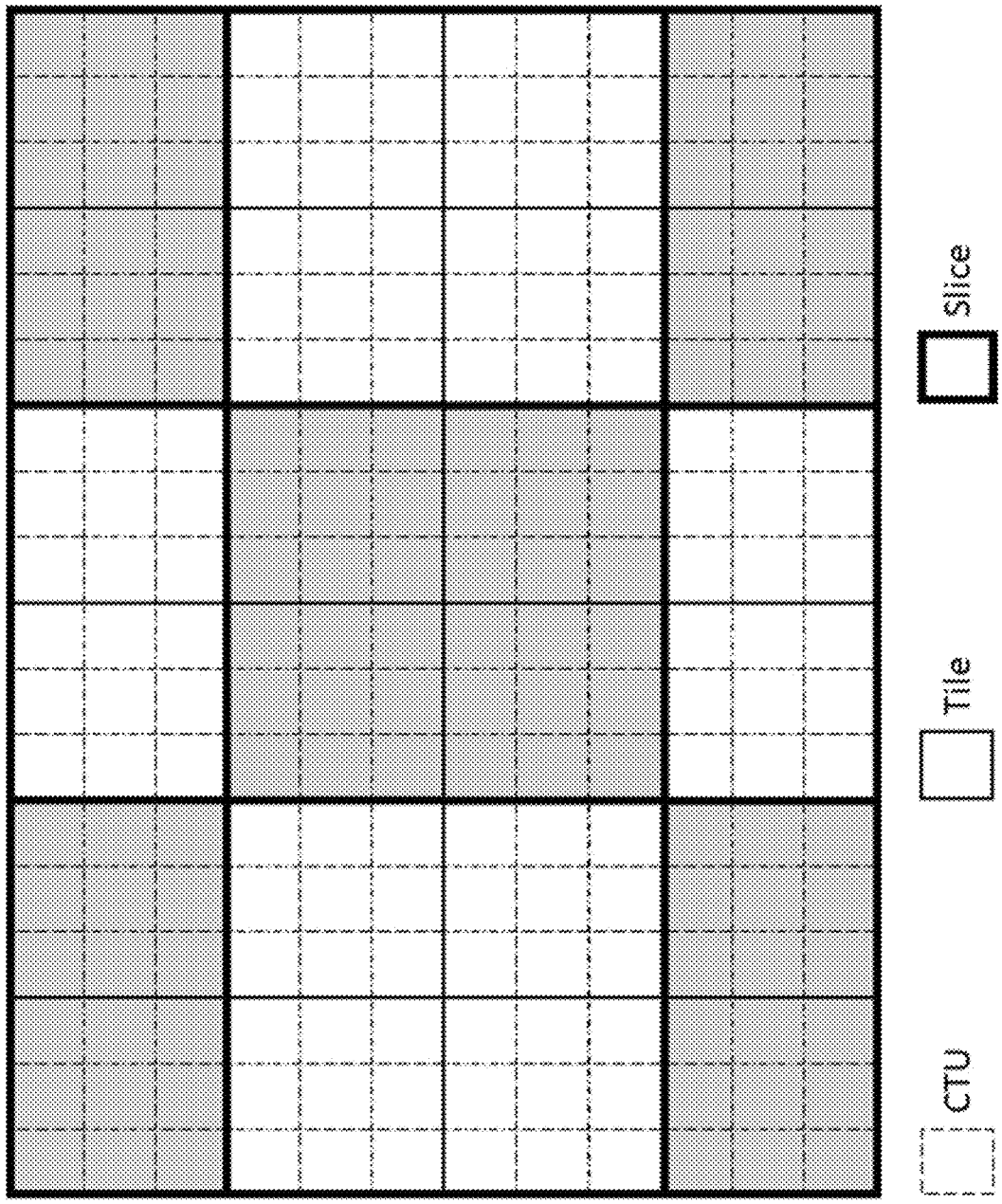
FIG. 2 shows an example of a picture with 18 by 12 luma CTUs that is partitioned into 24 tiles and 9 rectangular slices.

FIG. 2 shows an example of rectangular slice partitioning of a picture, where the picture is divided into 24 tiles (6 tile columns and 4 tile rows) and 9 rectangular slices.

Figure 3:
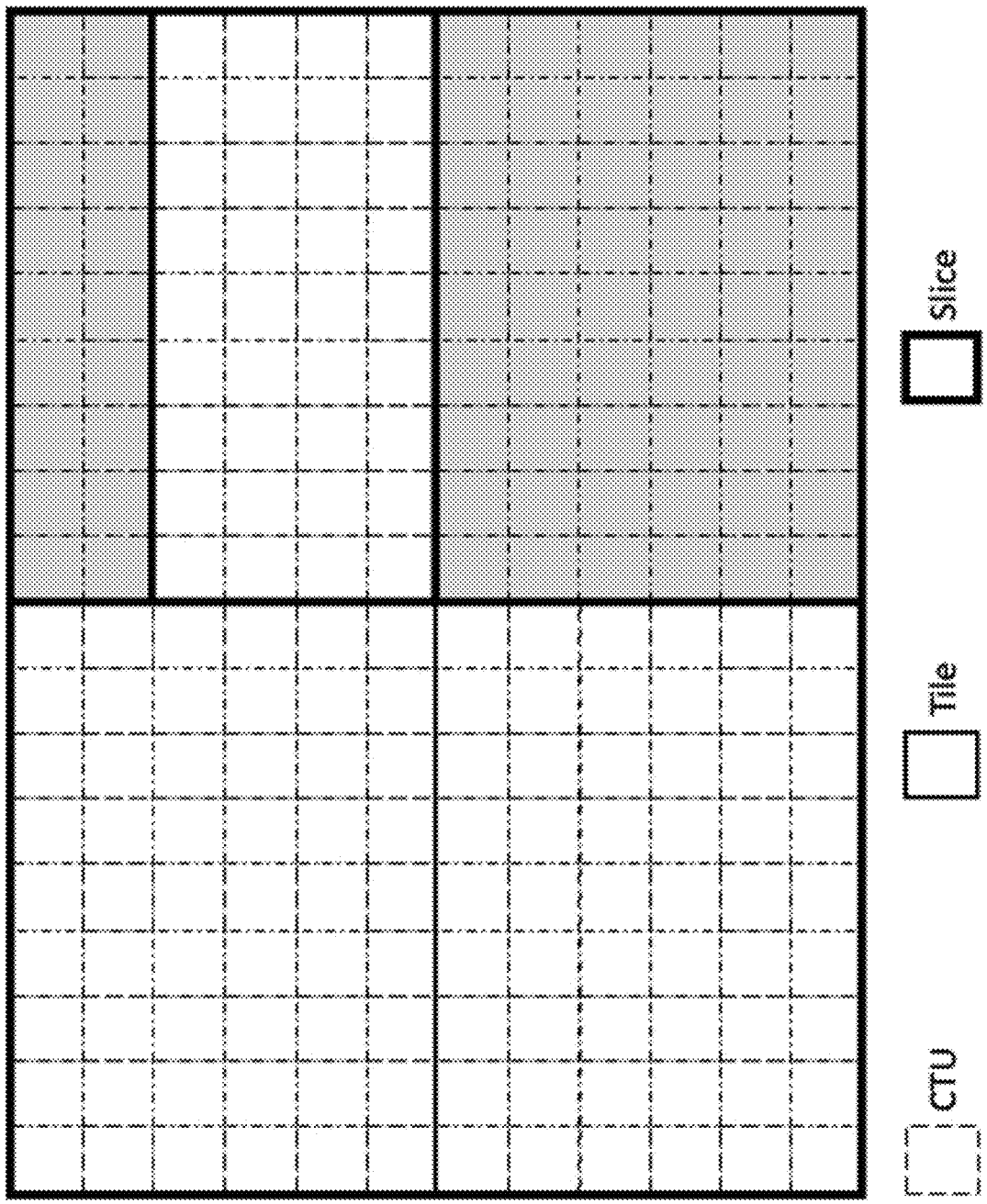
FIG. 3 shows an example of a picture partitioned into 4 tiles and 4 rectangular slices.

FIG. 3 shows an example of a picture partitioned into tiles and rectangular slices, where the picture is divided into 4 tiles (2 tile columns and 2 tile rows) and 4 rectangular slices.

Figure 4:
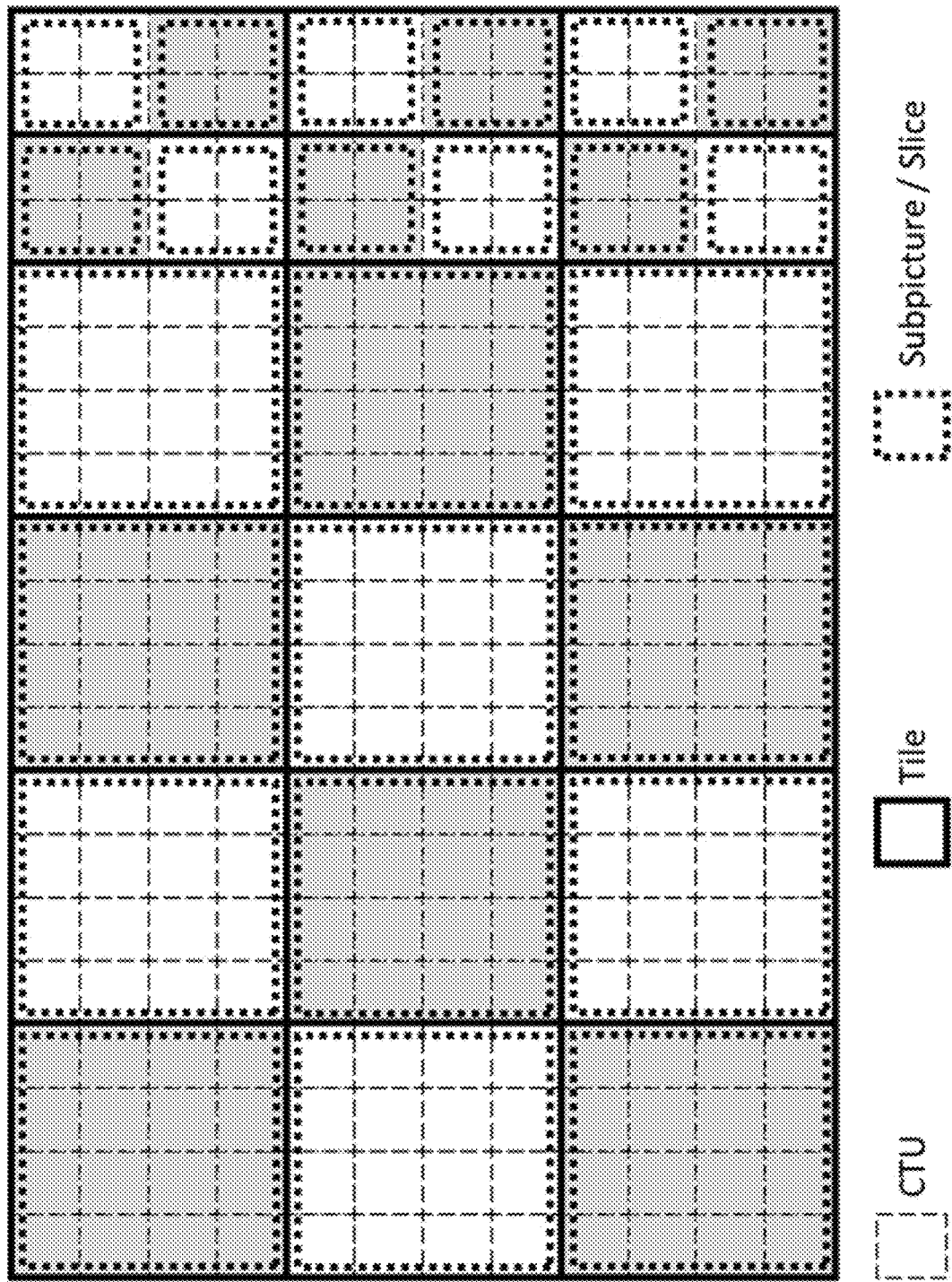
FIG. 4 shows an example of a picture that is partitioned into 15 tiles, 24 slices and 24 subpictures.

FIG. 4 shows an example of subpicture partitioning of a picture, where a picture is partitioned into 18 tiles, 12 on the left-hand side each covering one slice of 4 by 4 CTUs and 6 tiles on the right-hand side each covering 2 vertically-stacked slices of 2 by 2 CTUs, altogether resulting in 24 slices and 24 subpictures of varying dimensions (each slice is a subpicture).

3.3 Signaling of Subpictures, Slices, and Tiles in VVC

In the latest VVC draft text, information of subpictures, includes subpicture layout (i.e., the number of subpictures for each picture and the position and size of each picture) and other sequence-level subpicture information, is signaled in the SPS. The order of subpictures signaled in the SPS defines the subpicture index. A list of subpicture identifiers (IDs), one for each subpicture, may be explicitly signaled, e.g., in the SPS or in the PPS.

Tiles in VVC are conceptually the same as in HEVC, i.e., each picture is partitioned into tile columns and tile rows, but with different syntax in the PPS for signaling of tiles.

In VVC, the slice mode is also signaled in the PPS. When the slice mode is the rectangular slice mode, the slice layout (i.e., the number of slices for each picture and the position and size of each slice) for each picture is signaled in the PPS. The order of the rectangular slices within a picture signaled in the PPS defines the picture-level slice index. The subpicture-level slice index is defined as the order of the slices within a subpicture in increasing order of the picture-level slice indices. The positions and sizes of the rectangular slices are signaled/derived based on either the subpicture positions and sizes that are signaled in the SPS (when each subpicture contains only one slice), or based on the tile positions and sizes that are signaled in the PPS (when a subpicture may contain more than one slice). When the slice mode is the raster-scan slice mode, similarly as in HEVC, the layout of slices within a picture is signaled in the slices themselves, with different details.

3.4 Subpicture ID and Slice Address of a Coded Slice in VVC

In VVC, a VCL NAL unit is equivalent to a coded slice NAL unit. Each coded slice includes a slice header, which includes a subpicture ID (slice_subpic_id) and a slice address (slice_address). This pair of parameters indicates the location of the samples coded in the slice within the picture.

If the slice mode is the rectangular slice mode (i.e., rect_slice_flag is equal to 1), the slice address specifies the (subpicture-level) slice index of the slice among the slices within the subpicture.

Otherwise (rect_slice_flag is equal to 1, the slice mode is the raster-scan slice mode, and in this case the entire picture is one subpicture), the slice address specifies the tile index within the picture.

The semantics of slice_subpic_id and a slice address that are part of the general slice header semantics are included below for convenience.

7.4.8.1 General Slice Header Semantics

When present, the value of the slice header syntax element slice_pic_order_cnt_lsb shall be the same in all slice headers of a coded picture.
. . .
slice_subpic_id specifies the subpicture identifier of the subpicture that contains the slice. If slice_subpic_id is present, the value of the variable SubPicIdx is derived to be such that SubpicIdList[SubPicIdx] is equal to slice_subpic_id. Otherwise (slice_subpic_id is not present), the variable SubPicIdx is derived to be equal to 0. The length of slice_subpic_id, in bits, is derived as follows:
- If sps_subpic_id_signalling_present_flag is equal to 1, the length of slice_subpic_id is equal to sps_subpic_id_len_minus1+1.
- Otherwise, if ph_subpic_id_signalling_present_flag is equal to 1, the length of slice_subpic_id is equal to ph_subpic_id_len_minus1+1.
- Otherwise, if pps_subpic_id_signalling_present_flag is equal to 1, the length of slice_subpic_id is equal to pps_subpic_id_len_minus1+1.
- Otherwise, the length of slice_subpic_id is equal to Ceil (Log 2 (sps_num_subpics_minus1+1)).

slice_address specifies the slice address of the slice. When not present, the value of slice_address is inferred to be equal to 0.
If rect_slice_flag is equal to 0, the following applies:
- The slice address is the raster scan tile index.
- The length of slice_address is Ceil(Log 2 (NumTilesInPic)) bits.
- The value of slice_address shall be in the range of 0 to NumTilesInPic−1, inclusive.

Otherwise (rect_slice_flag is equal to 1), the following applies:—
- The slice address is the slice index of the slice within the SubPicIdx-th subpicture.
- The length of slice_address is Ceil(Log 2(NumSlicesInSubpic[SubPicIdx])) bits.
- The value of slice_address shall be in the range of 0 to NumSlicesInSubpic[SubPicIdx]−1, inclusive.

It is a requirement of bitstream conformance that the following constraints apply:
- If rect_slice_flag is equal to 0 or subpics_present_flag is equal to 0, the value of slice_address shall not be equal to the value of slice_address of any other coded slice NAL unit of the same coded picture.
- Otherwise, the pair of slice_subpic_id and slice_address values shall not be equal to the pair of slice_subpic_id and slice_address values of any other coded slice NAL unit of the same coded picture.
- When rect_slice_flag is equal to 0, the slices of a picture shall be in increasing order of their slice_address values.
- The shapes of the slices of a picture shall be such that each CTU, when decoded, shall have its entire left boundary and entire top boundary consisting of a picture boundary or consisting of boundaries of previously decoded CTU(s).

3.5 Decoding Order of NAL Units

In VVC, the decoding order of NAL units (i.e., the order of NAL units in a VVC bitstream) is specified in clause 7.4.2.4 and its subclauses of the latest VVC draft text, as well as in the SPS semantics (clause 7.4.3.3) and the general slice header semantics (clause 7.4.8.1). These texts are copied and pasted below for convenience.

7.4.2.4 Order of NAL Units and Association to Coded Pictures, PUs, AUs, and Coded Video Sequences

7.4.2.4.1 General

This clause specifies constraints on the order of NAL units in the bitstream.
Any order of NAL units in the bitstream obeying these constraints is referred to in the text as the decoding order of NAL units. Within a NAL unit, the syntax in clauses 7.3 and D.2 specifies the decoding order of syntax elements. When the VUI parameters or any SEI message specified in ITU-T H.SEI|ISO/IEC 23002-7 is included in a NAL unit specified in this Specification, the syntax of the VUI parameters or the SEI message specified in ITU-T H.SEI|ISO/IEC 23002-7 specifies the decoding order of those syntax elements. Decoders shall be capable of receiving NAL units and their syntax elements in decoding order.

7.4.2.4.2 Order of AUs and Association to CVSs

A bitstream conforming to this Specification consists of one or more CVSs.
A CVS consists of one or more AUs. The order of NAL units and coded pictures and their association to AUs is described in clause 7.4.2.4.3.
The first AU of a CVS is a CVSS AU, wherein each present PU is a CLVSS PU, which is either an IRAP PU with NoIncorrectPicOutputFlag equal to 1 or a GDR PU with NoIncorrectPicOutputFlag equal to 1.
Each CVSS AU shall have a picture in each of the layers present in the CVS.
It is a requirement of bitstream conformance that, when present, each PU in the next AU after an AU that contains an EOS NAL unit or an EOB NAL unit shall be an IRAP PU, which may be an IDR PU or a CRA PU, or a GDR PU.

7.4.2.4.3 Order of NAL Units and Coded Pictures and their Association to PUs and AUs This clause specifies the order of NAL units and coded pictures and their association to PUs and AUs for CVSs that conform to one or more of the profiles specified in Annex A and that are decoded using the decoding process specified in clauses 2 through 9.

A PU consists of one PH NAL unit, one coded picture, which comprises of one or more VCL NAL units, and zero or more non-VCL NAL units. The association of VCL NAL units to coded pictures is described in clause 7.4.2.4.4.

An AU consists of zero or one AU delimiter NAL unit and one or more PUs in increasing order of nuh_layer_id.

The first AU in the bitstream starts with the first NAL unit of the bitstream. There shall be at most one AU delimiter NAL unit in an AU.

The first VCL NAL unit of a picture is the first VCL NAL unit that follows the PH NAL unit in decoding order of the picture.

A VCL NAL unit is the first VCL NAL unit of an AU (and consequently the picture containing the first VCL NAL unit is the first picture of the AU) when the VCL NAL unit is the first VCL NAL unit of a picture and one or more the following conditions are true:
- The value of nuh_layer_id of the VCL NAL unit is less than the nuh_layer_id of the previous picture in decoding order.
- The value of slice_pic_order_cnt_lsb of the VCL NAL unit differs from the PicOrderCntVal of the previous picture in decoding order.
- PicOrderCntVal derived for the VCL NAL unit differs from the PicOrderCntVal of the previous picture in decoding order.

Let firstVclNalUnitInAu be the first VCL NAL unit of an AU. The first of any of the following NAL units preceding firstVclNalUnitInAu and succeeding the last VCL NAL unit preceding firstVclNalUnitInAu, if any, specifies the start of a new access unit:
- AUD NAL unit (when present),
- DPS NAL unit (when present),
- VPS NAL unit (when present),
- SPS NAL unit (when present),
- PPS NAL unit (when present),
- Prefix APS NAL unit (when present),
- PH NAL unit,
- Prefix SEI NAL unit (when present),
- NAL unit with nal_unit_type equal to RSV_NVCL_26 (when present),
- NAL unit with nal_unit_type in the range of UNSPEC28 . . . UNSPEC29 (when present).

NOTE—The first NAL unit preceding firstVclNalUnitInAu and succeeding the last VCL NAL unit preceding first VclNalUnitInAu, if any, can only be one of the above-listed NAL units.

The order of the coded pictures and non-VCL NAL units within a PU or an AU shall obey the following constraints:
- When an AU delimiter NAL unit is present in an AU, it shall be the first NAL unit of the AU.
- The PH NAL unit in a PU shall precede the first VCL NAL of the PU.
- When any DPS NAL units, VPS NAL units, SPS NAL units, PPS NAL units, prefix APS NAL units, prefix SEI NAL units, NAL units with nal_unit_type equal to RSV_NVCL_26, or NAL units with nal_unit_type in the range of UNSPEC_28 . . . UNSPEC_29 are present in a PU, they shall not follow the last VCL NAL unit of the PU.
- When any DPS NAL units, VPS NAL units, SPS NAL units, or PPS NAL units are present in a PU, they shall precede the PH NAL unit of the PU.
- NAL units having nal_unit_type equal to SUFFIX_APS_NUT, SUFFIX_SEI_NUT, FD_NUT, or RSV_NVCL_27, or in the range of UNSPEC_30 . . . UNSPEC_31 in a PU shall not precede the first VCL NAL unit of the PU.
- When an EOS NAL unit is present in a PU, it shall be the last NAL unit among all NAL units with in the PU other than an EOB NAL unit (when present).
- When an EOB NAL unit is present in an AU, it shall be the last NAL unit in the AU.

7.4.3.3 Sequence Parameter Set RBSP Semantics

An SPS RBSP shall be available to the decoding process prior to it being referenced, included in at least one AU with TemporalId equal to 0 or provided through external means.

. . .

It is a requirement of bitstream conformance that the following constraints apply:
For any two subpictures subpicA and subpicB, when the subpicture index of subpicA is less than that of subpicB, any coded slice NAL unit of subPicA shall precede any coded slice NAL unit of subPicB in decoding order.

. . .

. . .

7.4.8.2 General Slice Header Semantics

When present, the value of the slice header syntax element slice_pic_order_cnt_lsb shall be the same in all slice headers of a coded picture.

. . .

It is a requirement of bitstream conformance that the following constraints apply:

. . .

When rect_slice_flag is equal to 0, the slices of a picture shall be in increasing order of their slice_address values.

. . .

. . .

4. Drawbacks of Existing Implementations

The existing VVC design has the following problems:

(1) When the slice mode is the rectangular slice mode, the decoding order of VCL NAL units (i.e., coded slice NAL units) within a subpicture is not specified. Consequently, conforming decoder implementations need to tested and made sure that they can correctly decode bitstreams with any arbitrary order VCL NAL units within a subpicture when the slice mode is the rectangular slice mode. This would impose a heavy burden to decoder implementations, e.g., for conformance testing during the implementations.

(2) When slice_subpic_id is not present in the slice header, the value needs to be inferred, e.g., to be used for specifying NAL unit decoding order of VCL NAL units within a picture.

(3) The values of the subpicture IDs explicitly signaled in the SPS or PPS need to be constrained, to avoid any order of the subpicture IDs values in relative to the increasing order of the subpicture index values, which would also impose decoder implementation burden on conformance testing etc.

5. Example Embodiments of the Disclosed Technology

The detailed embodiments below should be considered as examples to explain general concepts. These embodiments should not be interpreted in a narrow way. Furthermore, these embodiments can be combined in any manner.
1) When the slice mode is the rectangular slice mode, the decoding order of VCL NAL units (i.e., coded slice NAL units) within a subpicture is specified to be increasing order of the subpicture ID values of the subpictures containing the VCL NAL units. Alternatively, when the slice mode is the rectangular slice mode, the decoding order of VCL NAL units (i.e., coded slice NAL units) within a subpicture is specified to be increasing order of the subpicture index values of the subpictures containing the VCL NAL units.
2) When the slice mode is the rectangular slice mode, the decoding order of VCL NAL units (i.e., coded slice NAL units) within a subpicture is specified to be in increasing order of the subpicture-level slice index values of the VCL NAL units. Note that the subpicture-level slice index value of a coded slice NAL unit is actually the value of the slice_address syntax element in the slice header.
3) When slice_subpic_id is not present, the value of slice_subpic_id is inferred, e.g., to be equal to 0.
4) It is required that the values of subpicture IDs are increasing in increasing order of the subpicture indices. Note that the decoding order of any two VCL NAL units (i.e., coded slice NAL units) within a picture but belonging to different subpictures is already specified in the latest VVC draft text, to be in an increasing order of the subpicture index values of the subpictures containing the VCL NAL units. With this constraint added, the decoding order of any two VCL NAL units within a picture but belonging to different subpictures can be specified to be in an increasing order of the subpicture ID values of the subpictures containing the VCL NAL units.

The examples described above may be incorporated in the context of the method described below, e.g., method 500, which may be implemented at a video decoder or a video encoder.

Figure 5:
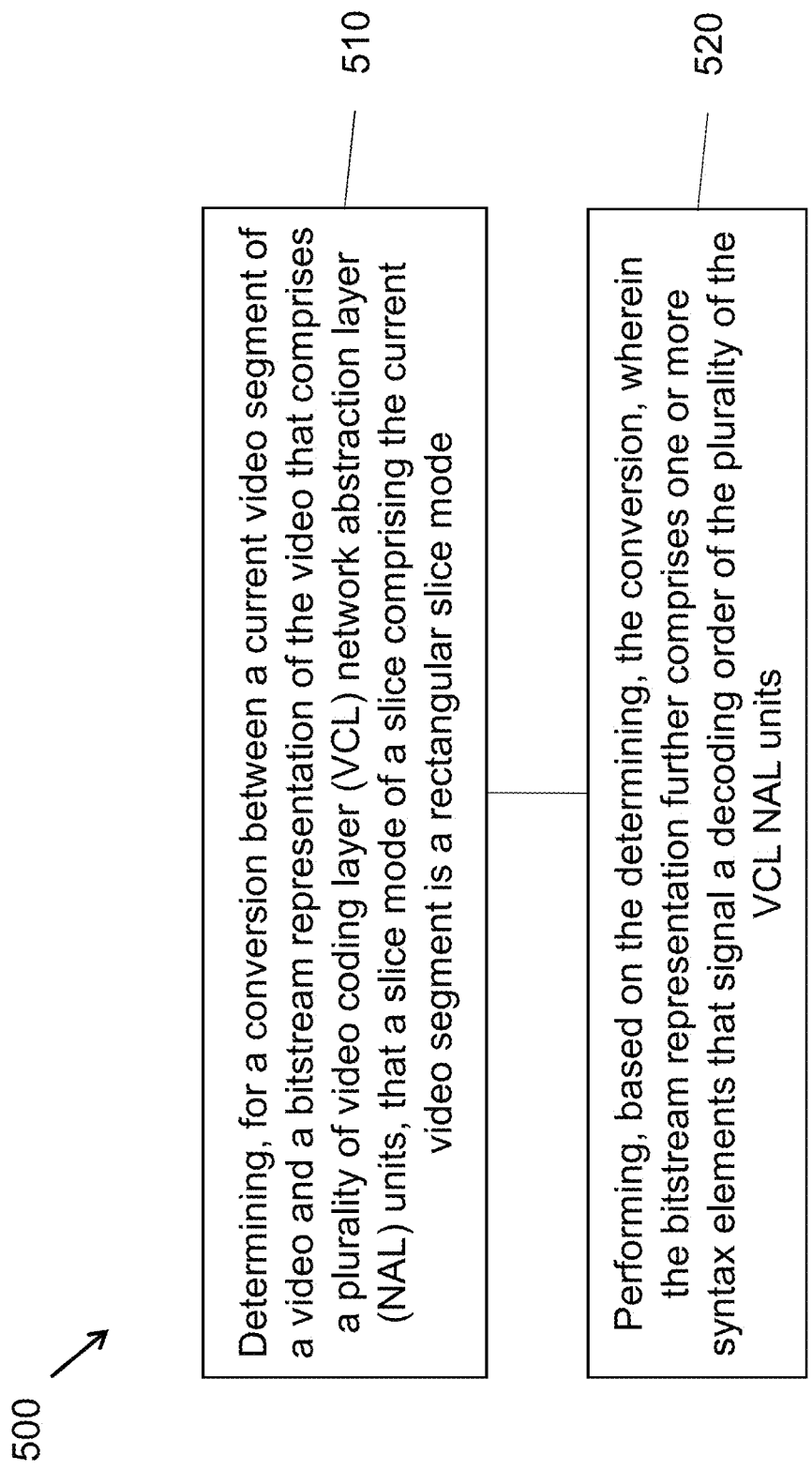
FIG. 5 shows a flowchart of an example method of video processing.

FIG. 5 shows a flowchart of an example method 500 for video processing. The method includes, at operation 510, determining, for a conversion between a current video segment of a video and a bitstream representation of the video that comprises a plurality of video coding layer (VCL) network abstraction layer (NAL) units, that a slice mode of a slice comprising the current video segment is a rectangular slice mode.

The method includes, at operation 520, performing, based on the determining, the conversion, wherein the bitstream representation further comprises one or more syntax elements that signal a decoding order of the plurality of the VCL NAL units.

6. Additional Example Embodiments

Below are some example embodiments, which can be applied to the VVC specification. The changed texts are based on the latest VVC text in JVET-P2001-v14). Newly added, modified and most relevant parts are doubleunderlined, and some of the deleted parts are surrounded by [[double bolded brackets]]. There are some other changes that are editorial in nature and thus not called out or marked differently.

6.1 First Embodiment

6.1.1 Definitions (VVC Clause 3)

. . .

picture-levelsliceindex:Anindexofaslicetothelistof slicesinapictureintheorderastheyaresignalledintheP-PSwhentherect_slice_flagisequalto1.

. . .

subpicture-levelsliceindex:Anindexofaslicetothelist ofslicesinasubpictureintheorderastheyaresignalled-inthePPSwhentherect_slice_flagisequalto1.

6.1.2 CTB Raster Scanning, Tile Scanning, and Subpicture Scanning Processes Definitions (VVC Clause 6.5.1)

. . .

The list NumSlicesInSubpic[i] and SliceSubpicToPicIdx[i][k], specifying the number of rectangular slices in the i-th subpicture and picture-levelsliceindex of the k-th slice in the i-th subpicture, are derived is derived as follows:

```
for( j = 0; j <= sps_num_subpics_minus1; j++ )
  NumSlicesInSubpic[ j ] = 0
for( i = 0; i <= num_slices_in_pic_minus1; i++ ) {
  posX = CtbAddrInSlice[ i ][ 0 ] % PicWidthInCtbsY * CtbSizeY
  posY = CtbAddrInSlice[ i ][ 0 ] / PicWidthInCtbsY * CtbSizeY
  for( j = 0; j <= sps_num_subpics_minus1; j++ ) {
    if( ( posX >= subpic_ctu_top_left_x[ j ]* CtbSizeY ) &&                                    (32)
        ( posX < ( subpic_ctu_top_left_x[ j ] + subpic_width_minus1 [ j ] + 1 ) * CtbSizeY ) &&
        ( posY >= subpic_ctu_top_left_y[ j ] * CtbSizeY ) &&
        ( posY < ( subpic_ctu_top_left_y[ j ] + subpic_height_minus1 [ j ] + 1 ) * CtbSizeY ) ) {
      SliceSubpicToPicIdx[ j ][ NumSlicesInSubpic[ j ] ] = i
      NumSlicesInSubpic[ j ]++
    }
  }
}
```

6.1.3 Order of NAL Units in the Bitstream (VVC Clause 7.4.2.4)

7.4.2.4 Order of NAL Units in the Bitstream

7.4.2.4.1 General

Subclauses of clause 7.4.2.4 specify constraints on the order of NAL units in the bitstream. Any order of NAL units in the bitstream obeying these constraints is referred to in the text as the decoding order of NAL units.
Within a NAL unit, the syntax in clauses 7.3 and D.2 specifies the decoding order of syntax elements. When the VUI parameters or any SEI message specified in ITU-T H.SEI|ISO/IEC 23002-7 is included in a NAL unit specified in this Specification, the syntax of the VUI parameters or the SEI message specified in ITU-T H.SEI|ISO/IEC 23002-7 specifies the decoding order of those syntax elements. Decoders shall be capable of receiving NAL units and their syntax elements in decoding order.

7.4.2.4.2 Order of AUs and their Association to CVSs

A bitstream consists of one or more CVSs. A CVS consists of one or more AUs. The order of PUs and their association to AUs are described in clause 0.
The first AU of a CVS is a CVSS AU, wherein each present PU is a CLVSS PU, which is either an IRAP PU with NoIncorrectPicOutputFlag equal to 1 or a GDR PU with NoIncorrectPicOutputFlag equal to 1.
Each CVSS AU shall have a PU for each of the layers present in the CVS.
It is a requirement of bitstream conformance that, when present, the next AU after an AU that contains an EOB NAL unit shall be a CVSS AU.

7.4.2.4.3 Order of PUs and their Association to AUs

An AU consists of one or more PUs in increasing order of nuh_layer_id. The order NAL units and coded pictures and their association to PUs are described in clause 7.4.2.4.4.
There can be at most one AUD NAL unit in an AU. When an AUD NAL unit is present in an AU, it shall be the first NAL unit of the AU, and consequently, it is the first NAL unit of the first PU of the AU.
There can be at most one EOB NAL unit in an AU. When an EOB NAL unit is present in an AU, it shall be the last NAL unit of the AU, and consequently, it is the last NAL unit of the last PU of the AU.
A VCL NAL unit is the first VCL NAL unit of an AU (and consequently the PU containing the VCL NAL unit is the first PU of the AU) when the VCL NAL unit is the first VCL NAL unit that follows a PH NAL unit and one or more the following conditions are true:
  The value of nuh_layer_id of the VCL NAL unit is less than the nuh_layer_id of the previous picture in decoding order.
  The value of slice_pic_order_cnt_lsb of the VCL NAL unit differs from the PicOrderCntVal of the previous picture in decoding order.
  PicOrderCntVal derived for the VCL NAL unit differs from the PicOrderCntVal of the previous picture in decoding order.
Let firstVclNalUnitInAu be the first VCL NAL unit of an AU. The first of any of the following NAL units preceding firstVclNalUnitInAu and succeeding the last VCL NAL unit preceding firstVclNalUnitInAu, if any, specifies the start of a new AU:
  AUD NAL unit (when present),
  DPS NAL unit (when present),
  VPS NAL unit (when present),
  SPS NAL unit (when present),
  PPS NAL unit (when present),
  Prefix APS NAL unit (when present),
  PH NAL unit,
  Prefix SEI NAL unit (when present),
  NAL unit with nal_unit_type equal to RSV_NVCL_26 (when present),
  NAL unit with nal_unit_type in the range of UNSPEC28 . . . UNSPEC29 (when present).
  NOTE—The first NAL unit preceding firstVclNalUnitInAu and succeeding the last VCL NAL unit preceding first VclNalUnitInAu, if any, can only be one of the above-listed NAL units.
It is a requirement of bitstream conformance that, when present, the next PU of a particular layer after a PU that belongs to the same layer and contains an EOS NAL unit or an EOB NAL unit shall be a CLVSS PU, which is either an IRAP PU with NoIncorrectPicOutputFlag equal to 1 or a GDR PU with NoIncorrectPicOutputFlag equal to 1.

7.4.2.4.4 Order of NAL Units and Coded Pictures and their Association to PUs A PU consists of one PH NAL unit, one coded picture, which comprises of one or more VCL NAL units, and zero or more other non-VCL NAL units. The association of VCL NAL units to coded pictures is described in clause 7.4.2.4.4. The first VCL NAL unit of a picture is the first VCL NAL unit that follows the PH NAL unit of the picture.
The order of non-VCL NAL units (other than AUD and EOB NAL units) within a PU shall obey the following constraints:
  The PH NAL unit in a PU shall precede the first VCL NAL of the PU.
  When any DPS NAL units, VPS NAL units, SPS NAL units, PPS NAL units, prefix APS NAL units, prefix SEI NAL units, NAL units with nal_unit_type equal to RSV_NVCL_26, or NAL units with nal_unit_type in the range of UNSPEC_28 . . . UNSPEC_29 are present in a PU, they shall not follow the last VCL NAL unit of the PU.
  When any DPS NAL units, VPS NAL units, SPS NAL units, or PPS NAL units are present in a PU, they shall precede the PH NAL unit of the PU.
  NAL units having nal_unit_type equal to SUFFIX_APS_NUT, SUFFIX_SEI_NUT, FD_NUT, or RSV_NVCL_27, or in the range of UNSPEC_30 . . . UNSPEC_31 in a PU shall not precede the first VCL NAL unit of the PU.
  When an EOS NAL unit is present in a PU, it shall be the last NAL unit among all NAL units with in the PU other than an EOB NAL unit (when present).

7.4.2.4.5 Order of VCL NAL Units and their Association to Coded Pictures

TheorderoftheVCLNALunitswithinacodedpictureis constrainedasfollows:
  ForanytwocodedsliceNALunitsAandBofacodedpicture, letsubpicIdAandsubpicIdBbetheirslice_subpic_idvalues,andsliceAddrAandsliceddrBbetheirsliceaddressvalues.

When either of the following conditions is true, coded slice NAL unit A shall precede coded slice NAL unit B:
    subpicIdA is less than subpicIdB.
    subpicIdA is equal to subpicIdB and sliceAddrA is less than sliceAddrB.

6.1.4 Sequence Parameter Set RBSP Semantics (VVC Clause 7.4.3.3)

An SPS RBSP shall be available to the decoding process prior to it being referenced, included in at least one AU with TemporalId equal to 0 or provided through external means.
. . .
It is a requirement of bitstream conformance that the following constraints apply:
  [[For any two subpictures subpicA and subpicB, when the subpicture index of subpicA is less than that of subpicB, any coded slice NAL unit of subPicA shall precede any coded slice NAL unit of subPicB in decoding order.]]
  The shapes of the subpictures shall be such that each subpicture, when decoded, shall have its entire left boundary and entire top boundary consisting of picture boundaries or consisting of boundaries of previously decoded subpictures.
. . .

6.1.5 General Slice Header Semantics (VVC Clause 7.4.8.2)

When present, the value of the slice header syntax element slice_pic_order_cnt_lsb shall be the same in all slice headers of a coded picture.
. . .
slice_subpic_id specifies the subpicture identifier of the subpicture that contains the slice. When not present, the value of slice_subpic_id is inferred to be equal to 0. [[If slice_subpic_id is present, t]]The value of the variable SubPicIdx is derived to be such that SubpicIdList[SubPicIdx] is equal to slice_subpic_id. [[Otherwise (slice_subpic_id is not present), the variable SubPicIdx is derived to be equal to 0.]]
It is a requirement of bitstream conformance that, for any i and j in the range of 0 to sps_num_subpics_minus1, inclusive, when i is less than j, SubpicIdList[i] shall be less than SubpicIdList[j].
The length of slice_subpic_id, in bits, is derived as follows:
  If sps_subpic_id_signalling_present_flag is equal to 1, the length of slice_subpic_id is equal to sps_subpic_id_len_minus1+1.
  Otherwise, if ph_subpic_id_signalling_present_flag is equal to 1, the length of slice_subpic_id is equal to ph_subpic_id_len_minus1+1.
  Otherwise, if pps_subpic_id_signalling_present_flag is equal to 1, the length of slice_subpic_id is equal to pps_subpic_id_len_minus1+1.
Otherwise, the length of slice_subpic_id is equal to Ceil(Log 2 (sps_num_subpics_minus1+1)).
slice_address specifies the slice address of the slice. When not present, the value of slice_address is inferred to be equal to 0.
If rect_slice_flag is equal to 0, the following applies:
  The slice address is the raster scan tile index.
  The length of slice_address is Ceil(Log 2 (NumTilesInPic)) bits.
  The value of slice_address shall be in the range of 0 to NumTilesInPic−1, inclusive.
Otherwise (rect_slice_flag is equal to 1), the following applies:
  The slice address is the subpicture-level slice index of the slice [[within the SubPicIdx-th subpicture]].
  The length of slice_address is Ceil(Log 2(NumSlicesInSubpic[SubPicIdx])) bits.
  The value of slice_address shall be in the range of 0 to NumSlicesInSubpic[SubPicIdx]−1, inclusive.
It is a requirement of bitstream conformance that the following constraints apply:—
  If rect_slice_flag is equal to 0 or subpics_present_flag is equal to 0, the value of slice_address shall not be equal to the value of slice_address of any other coded slice NAL unit of the same coded picture.
  Otherwise, the pair of slice_subpic_id and slice_address values shall not be equal to the pair of slice_subpic_id and slice_address values of any other coded slice NAL unit of the same coded picture.
  [[When rect_slice_flag is equal to 0, the slices of a picture shall be in increasing order of their slice_address values.]]
  The shapes of the slices of a picture shall be such that each CTU, when decoded, shall have its entire left boundary and entire top boundary consisting of a picture boundary or consisting of boundaries of previously decoded CTU(s).
. . .

6.2 Second Embodiment

In this embodiment, the following changes are made relative to the first embodiment:
1) The following constraint, as in the general slice header semantics, is removed.
   It is a requirement of bitstream conformance that, for any i and j in the range of 0 to sps_num_subpics_minus1, inclusive, when i is less than j, SubpicIdList[i] shall be less than SubpicIdList[j].
   Alternatively, this constraint is kept unremoved.
2) The text for specifying the order of VCL NAL units and their association to coded pictures is changed to be the following. Newly added, modified and most relevant parts are doubleunderlined, and some of the deleted parts are surrounded by [[double bolded brackets]].
   The order of the VCL NAL units within a coded picture is constrained as follows:
     For any two coded slice NAL units A and B of a coded picture, let subpicIdxA and subpicIdxB be their SubPicIdx [[slice_subpic_id]] values and sliceAddrA and sliceddrB be their slice_address values.
     When either of the following conditions is true, coded slice NAL unit A shall precede coded slice NAL unit B:
       subpicIdxA is less than subpicIdxB.
       subpicIdxA is equal to subpicIdxB and sliceAddrA is less than sliceAddrB.

7. Example Implementations of the Disclosed Technology

Figure 6:
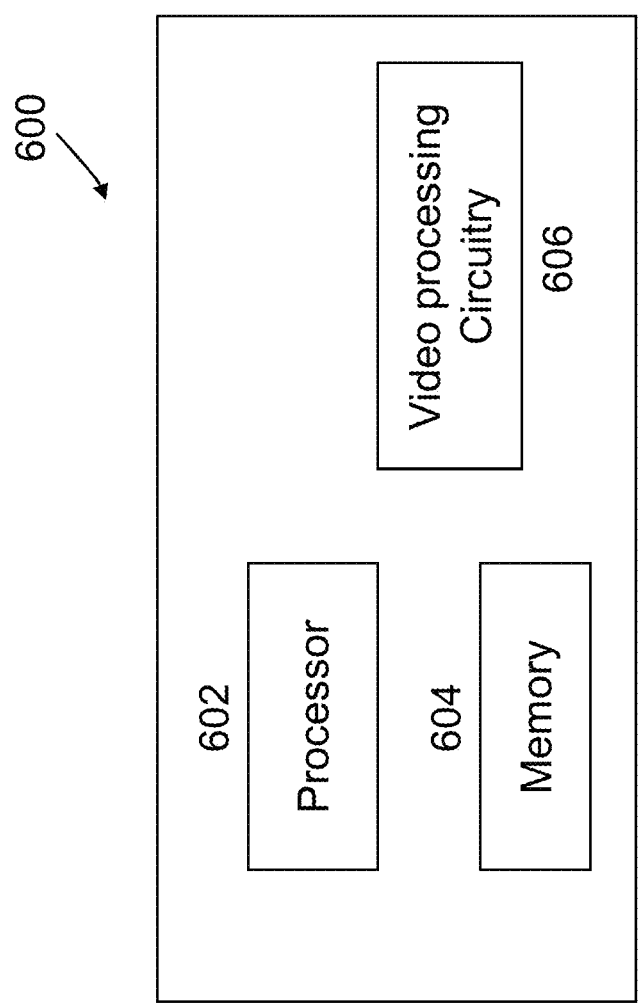
FIG. 6 is a block diagram of an example of a video processing apparatus.

FIG. 6 is a block diagram of a video processing apparatus 600. The apparatus 600 may be used to implement one or more of the methods described herein. The apparatus 600 may be embodied in a smartphone, tablet, computer, Internet of Things (IoT) receiver, and so on. The apparatus 600 may include one or more processors 602, one or more memories 604 and video processing hardware 606. The processor(s) 602 may be configured to implement one or more methods described in the present disclosure. The memory (memories) 604 may be used for storing data and code used for implementing the methods and techniques described herein. The video processing hardware 606 may be used to implement, in hardware circuitry, some techniques described in the present disclosure.

Figure 7:
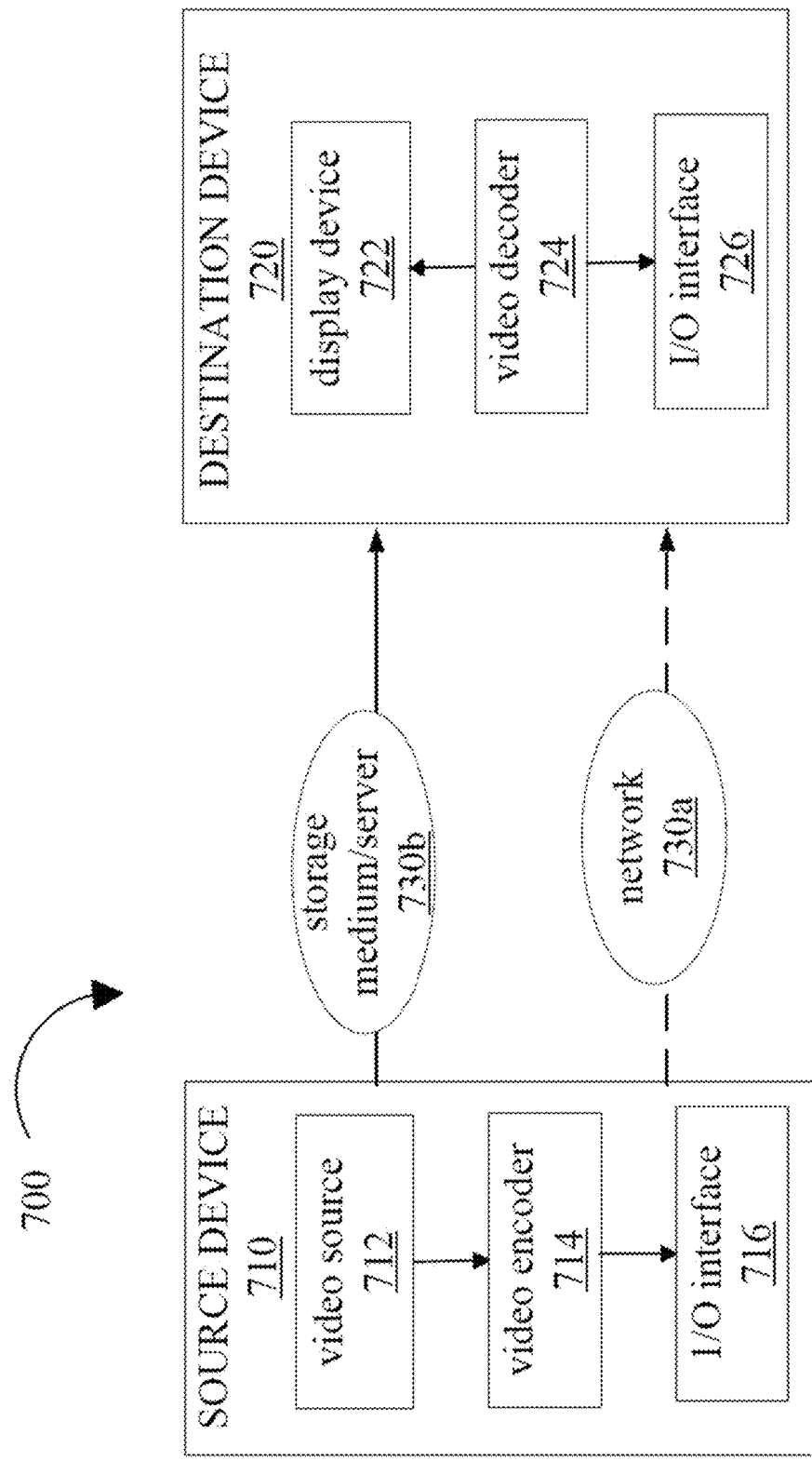
FIG. 7 is a block diagram that illustrates an example video coding system.

FIG. 7 is a block diagram that illustrates an example video coding system 700 that may utilize the techniques of this disclosure.

As shown in FIG. 7, video coding system 700 may include a source device 710 and a destination device 720. Source device 710 generates encoded video data which may be referred to as a video encoding device. Destination device 720 may decode the encoded video data generated by source device 710 which may be referred to as a video decoding device.

Source device 710 may include a video source 712, a video encoder 714, and an input/output (I/O) interface 716.

Video source 712 may include a source such as a video capture device, an interface to receive video data from a video content provider, and/or a computer graphics system for generating video data, or a combination of such sources. The video data may comprise one or more pictures. Video encoder 714 encodes the video data from video source 712 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 716 may include a modulator/demodulator (modem) and/or a transmitter. The encoded video data may be transmitted directly to destination device 720 via I/O interface 716 through network 730a. The encoded video data may also be stored onto a storage medium/server 730b for access by destination device 720.

Destination device 720 may include an I/O interface 726, a video decoder 724, and a display device 722.

I/O interface 726 may include a receiver and/or a modem. I/O interface 726 may acquire encoded video data from the source device 710 or the storage medium/server 730b. Video decoder 724 may decode the encoded video data. Display device 722 may display the decoded video data to a user. Display device 722 may be integrated with the destination device 720, or may be external to destination device 720 which be configured to interface with an external display device.

Video encoder 714 and video decoder 724 may operate according to a video compression standard, such as the High Efficiency Video Coding (HEVC) standard, Versatile Video Coding (VVC) standard and other current and/or further standards.

Figure 8:
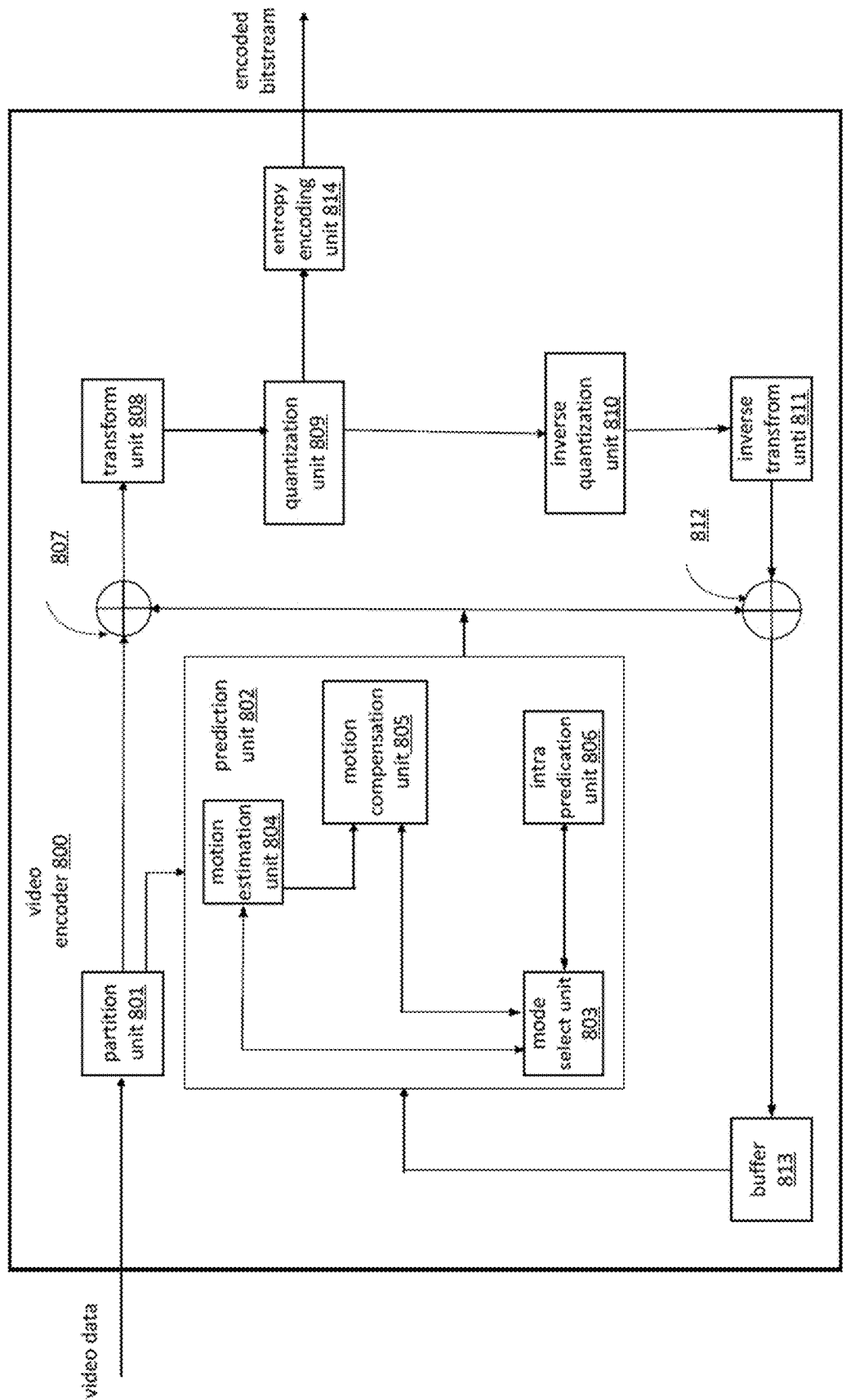
FIG. 8 is a block diagram that illustrates an example encoder.

FIG. 8 is a block diagram illustrating an example of video encoder 800, which may be video encoder 714 in the system 700 illustrated in FIG. 7.

Video encoder 800 may be configured to perform any or all of the techniques of this disclosure. In the example of FIG. 8, video encoder 800 includes a plurality of functional components. The techniques described in this disclosure may be shared among the various components of video encoder 800. In some examples, a processor may be configured to perform any or all of the techniques described in this disclosure.

The functional components of video encoder 800 may include a partition unit 801, a predication unit 802 which may include a mode select unit 803, a motion estimation unit 804, a motion compensation unit 805 and an intra prediction unit 806, a residual generation unit 807, a transform unit 808, a quantization unit 809, an inverse quantization unit 810, an inverse transform unit 811, a reconstruction unit 812, a buffer 813, and an entropy encoding unit 814.

In other examples, video encoder 800 may include more, fewer, or different functional components. In an example, predication unit 802 may include an intra block copy (IBC) unit. The IBC unit may perform predication in an IBC mode in which at least one reference picture is a picture where the current video block is located.

Furthermore, some components, such as motion estimation unit 804 and motion compensation unit 805 may be highly integrated, but are represented in the example of FIG. 8 separately for purposes of explanation.

Partition unit 801 may partition a picture into one or more video blocks. Video encoder 800 and video decoder 900 may support various video block sizes.

Mode select unit 803 may select one of the coding modes, intra or inter, e.g., based on error results, and provide the resulting intra- or inter-coded block to a residual generation unit 807 to generate residual block data and to a reconstruction unit 812 to reconstruct the encoded block for use as a reference picture. In some example, Mode select unit 803 may select a combination of intra and inter predication (CIIP) mode in which the predication is based on an inter predication signal and an intra predication signal. Mode select unit 803 may also select a resolution for a motion vector (e.g., a sub-pixel or integer pixel precision) for the block in the case of inter-predication.

To perform inter prediction on a current video block, motion estimation unit 804 may generate motion information for the current video block by comparing one or more reference frames from buffer 813 to the current video block. Motion compensation unit 805 may determine a predicted video block for the current video block based on the motion information and decoded samples of pictures from buffer 813 other than the picture associated with the current video block.

Motion estimation unit 804 and motion compensation unit 805 may perform different operations for a current video block, for example, depending on whether the current video block is in an I slice, a P slice, or a B slice.

In some examples, motion estimation unit 804 may perform uni-directional prediction for the current video block, and motion estimation unit 804 may search reference pictures of list 0 or list 7 for a reference video block for the current video block. Motion estimation unit 804 may then generate a reference index that indicates the reference picture in list 0 or list 7 that contains the reference video block and a motion vector that indicates a spatial displacement between the current video block and the reference video block. Motion estimation unit 804 may output the reference index, a prediction direction indicator, and the motion vector as the motion information of the current video block. Motion compensation unit 805 may generate the predicted video block of the current block based on the reference video block indicated by the motion information of the current video block.

In other examples, motion estimation unit 804 may perform bi-directional prediction for the current video block, motion estimation unit 804 may search the reference pictures in list 0 for a reference video block for the current video block and may also search the reference pictures in list 7 for another reference video block for the current video block. Motion estimation unit 804 may then generate reference indexes that indicate the reference pictures in list 0 and list 7 containing the reference video blocks and motion vectors that indicate spatial displacements between the reference video blocks and the current video block. Motion estimation unit 804 may output the reference indexes and the motion vectors of the current video block as the motion information of the current video block. Motion compensation unit 805 may generate the predicted video block of the current video block based on the reference video blocks indicated by the motion information of the current video block.

In some examples, motion estimation unit 804 may output a full set of motion information for decoding processing of a decoder.

In some examples, motion estimation unit 804 may do not output a full set of motion information for the current video. Rather, motion estimation unit 804 may signal the motion information of the current video block with reference to the motion information of another video block. For example, motion estimation unit 804 may determine that the motion information of the current video block is sufficiently similar to the motion information of a neighboring video block.

In one example, motion estimation unit 804 may indicate, in a syntax structure associated with the current video block, a value that indicates to the video decoder 900 that the current video block has the same motion information as the another video block.

In another example, motion estimation unit 804 may identify, in a syntax structure associated with the current video block, another video block and a motion vector difference (MVD). The motion vector difference indicates a difference between the motion vector of the current video block and the motion vector of the indicated video block. The video decoder 900 may use the motion vector of the indicated video block and the motion vector difference to determine the motion vector of the current video block.

As discussed above, video encoder 800 may predictively signal the motion vector. Two examples of predictive signaling techniques that may be implemented
by video encoder 800 include advanced motion vector predication (AMVP) and merge mode signaling.

Intra prediction unit 806 may perform intra prediction on the current video block. When intra prediction unit 806 performs intra prediction on the current video block, intra prediction unit 806 may generate prediction data for the current video block based on decoded samples of other video blocks in the same picture. The prediction data for the current video block may include a predicted video block and various syntax elements.

Residual generation unit 807 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 807 may not perform the subtracting operation.

Transform processing unit 808 may generate one or more transform coefficient video blocks for the current video block by applying one or more transforms to a residual video block associated with the current video block.

After transform processing unit 808 generates a transform coefficient video block associated with the current video block, quantization unit 809 may quantize the transform coefficient video block associated with the current video block based on one or more quantization parameter (QP) values associated with the current video block.

Inverse quantization unit 810 and inverse transform unit 811 may apply inverse quantization and inverse transforms to the transform coefficient video block, respectively, to reconstruct a residual video block from the transform coefficient video block. Reconstruction unit 812 may add the reconstructed residual video block to corresponding samples from one or more predicted video blocks generated by the predication unit 802 to produce a reconstructed video block associated with the current block for storage in the buffer 813.

After reconstruction unit 812 reconstructs the video block, loop filtering operation may be performed reduce video blocking artifacts in the video block.

Entropy encoding unit 814 may receive data from other functional components of the video encoder 800. When entropy encoding unit 814 receives the data, entropy encoding unit 814 may perform one or more entropy encoding operations to generate entropy encoded data and output a bitstream that includes the entropy encoded data.

Figure 9:
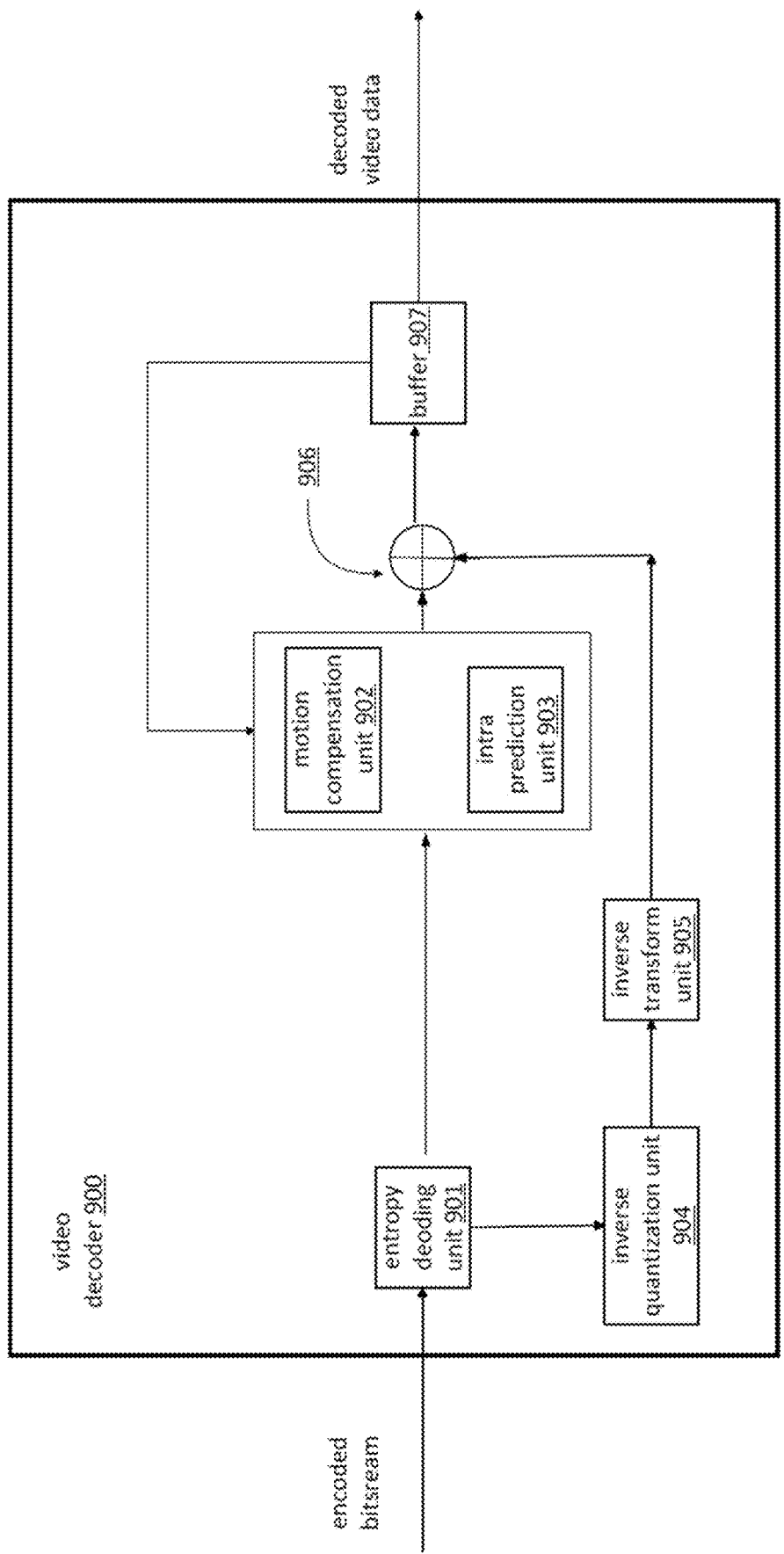
FIG. 9 is a block diagram that illustrates an example decoder.

FIG. 9 is a block diagram illustrating an example of video decoder 900 which may be video decoder 714 in the system 700 illustrated in FIG. 7.

The video decoder 900 may be configured to perform any or all of the techniques of this disclosure. In the example of FIG. 9, the video decoder 900 includes a plurality of functional components. The techniques described in this disclosure may be shared among the various components of the video decoder 900. In some examples, a processor may be configured to perform any or all of the techniques described in this disclosure.

In the example of FIG. 9, video decoder 900 includes an entropy decoding unit 901, a motion compensation unit 902, an intra prediction unit 903, an inverse quantization unit 904, an inverse transformation unit 905, and a reconstruction unit 906 and a buffer 907. Video decoder 900 may, in some examples, perform a decoding pass generally reciprocal to the encoding pass described with respect to video encoder 800 (FIG. 8).

Entropy decoding unit 901 may retrieve an encoded bitstream. The encoded bitstream may include entropy coded video data (e.g., encoded blocks of video data). Entropy decoding unit 901 may decode the entropy coded video data, and from the entropy decoded video data, motion compensation unit 902 may determine motion information including motion vectors, motion vector precision, reference picture list indexes, and other motion information. Motion compensation unit 902 may, for example, determine such information by performing the AMVP and merge mode.

Motion compensation unit 902 may produce motion compensated blocks, possibly performing interpolation based on interpolation filters. Identifiers for interpolation filters to be used with sub-pixel precision may be included in the syntax elements.

Motion compensation unit 902 may use interpolation filters as used by video encoder 80 during encoding of the video block to calculate interpolated values for sub-integer pixels of a reference block. Motion compensation unit 902 may determine the interpolation filters used by video encoder 800 according to received syntax information and use the interpolation filters to produce predictive blocks.

Motion compensation unit 902 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 903 may use intra prediction modes for example received in the bitstream to form a prediction block from spatially adjacent blocks. Inverse quantization unit 903 inverse quantizes, i.e., de-quantizes, the quantized video block coefficients provided in the bitstream and decoded by entropy decoding unit 901. Inverse transform unit 903 applies an inverse transform.

Reconstruction unit 906 may sum the residual blocks with the corresponding prediction blocks generated by motion compensation unit 802 or intra-prediction unit 903 to form decoded blocks. If desired, a deblocking filter may also be applied to filter the decoded blocks in order to remove blockiness artifacts. The decoded video blocks are then stored in buffer 907, which provides reference blocks for subsequent motion compensation/intra predication and also produces decoded video for presentation on a display device.

Figure 10:
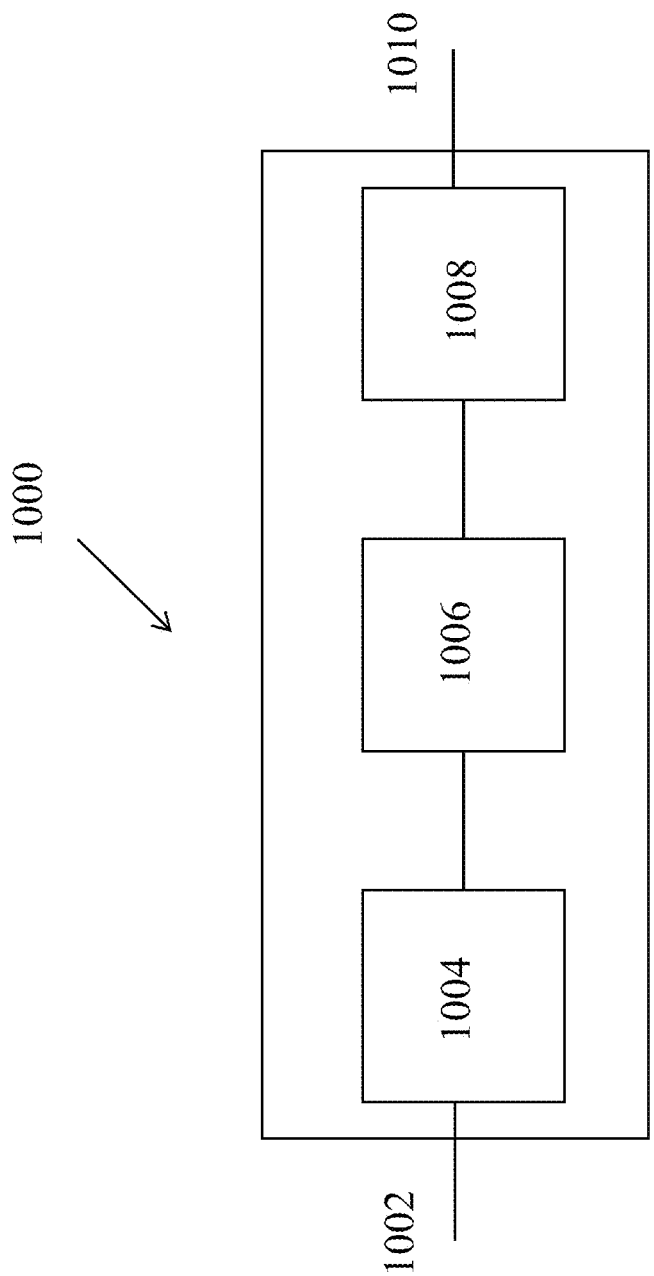
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as wireless fidelity (Wi-Fi) or cellular interfaces.

The system 1000 may include a coding component 1004 that may implement the various coding or encoding methods described in the present disclosure. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present disclosure may be embodied in various electronic devices such as mobile phones, laptops, smartphones or other devices that are capable of performing digital data processing and/or video display.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this present disclosure can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., erasable programmable read-only memory (EPROM), electrically erasable programmable read-only memory (EEPROM), and flash memory devices. The processor and the memory can be supplemented by, or incorporated in, special purpose logic circuitry.

Some embodiments may be described using the following clause-based format. The first set of clauses show example embodiments of techniques discussed in the previous sections.

A1. A method of video processing, comprising: determining, for a conversion between a current video segment of a video and a bitstream representation of the video that comprises a plurality of video coding layer (VCL) network abstraction layer (NAL) units, that a slice mode of a slice comprising the current video segment is a rectangular slice mode; and performing, based on the determining, the conversion, wherein the bitstream representation further comprises one or more syntax elements that signal a decoding order of the plurality of the VCL NAL units.

A2-1. The method of clause A1, wherein the decoding order comprises subpicture ID values of subpictures comprising the plurality of the VCL NAL units in an ascending order.

A2-2. The method of clause A1, wherein the decoding order comprises subpicture-level slice index values of the plurality of the VCL NAL units in an ascending order.

A3-1. The method of clause A1, wherein the decoding order comprises subpicture index values of subpictures comprising the plurality of the VCL NAL units in an ascending order. A3-2. The method of clause A1, wherein one of the subpicture-level slice index values is a value of a slice_address syntax element in a slice header.

A4. The method of any of clauses A1 to A3, wherein a value of a slice_subpic_id parameter is inferred to be zero upon a determination that the bitstream representation excludes the slice_subpic_id parameter.

A5. The method of clause A2 and A3, wherein the subpicture ID values monotonically increase with the subpicture index values.

A6. The method of any of clauses A1 to A5, the conversion generates the current video segment from the bitstream representation.

A7. The method of any of clauses A1 to A5, wherein the conversion generates the bitstream representation from the current video segment.

A8. The method of any of clauses A1 to A7, wherein the current video segment is a current slice, a current block, a current tile or a current subpicture.

A9. A video processing apparatus comprising a processor configured to implement a method recited in any one or more of clauses A1 to A8.

A10. A computer readable recoding media on which a program comprising code is recorded, the program is for a processor to carry out a method recited in anyone of clauses A1 to A8.

A11. A computer program product stored on a non-transitory computer readable media, the computer program product including program code for carrying out the method in any one of clauses A1 to A8.

The second set of clauses describe certain features and aspects of the disclosed techniques in the previous section.

Figure 11:
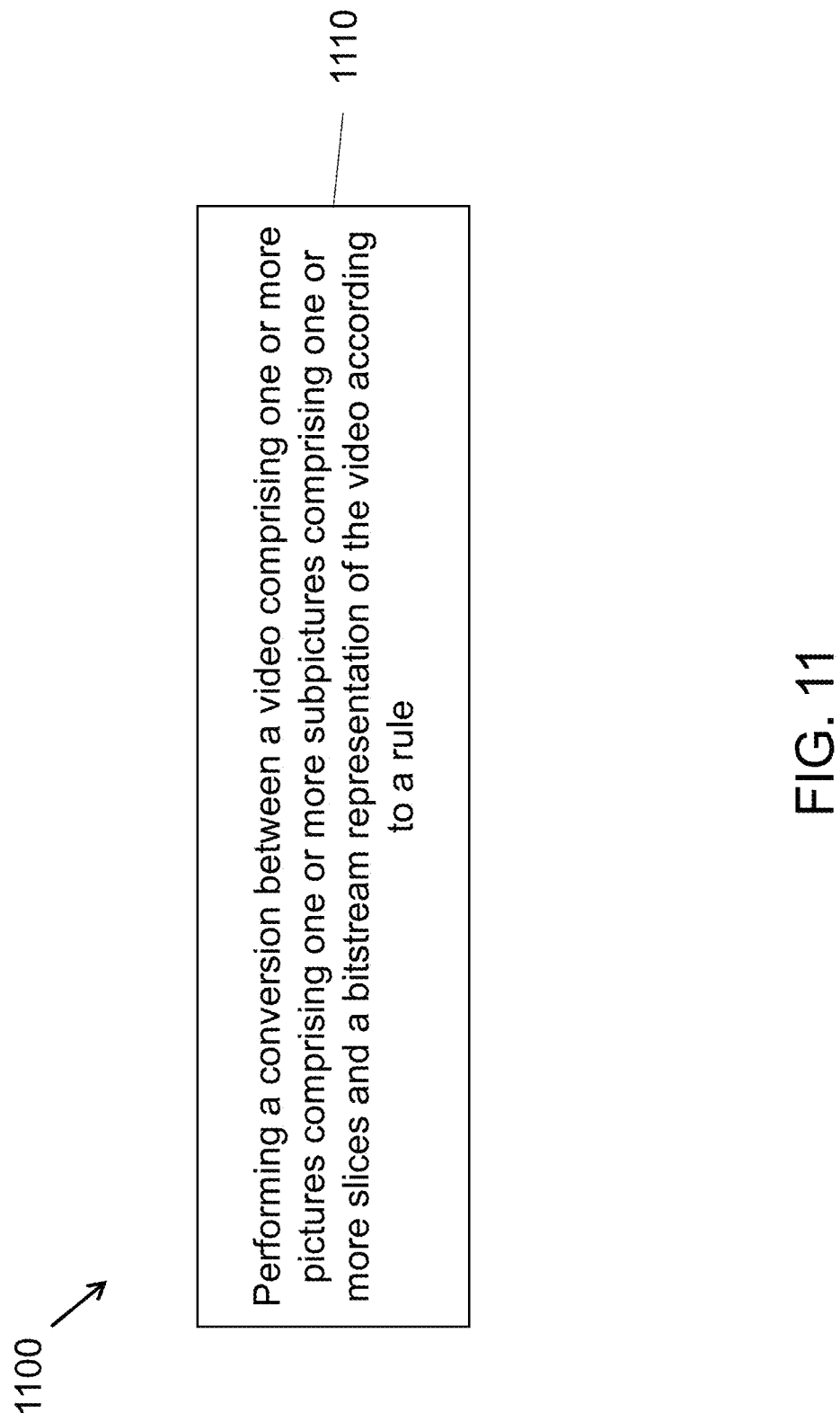
FIG. 11 is a flowchart of an example method of video processing based on some implementations of the disclosed technology.

1. A method of video processing (e.g., method 1100 as shown in FIG. 11), comprising: performing 1110 a conversion between a video comprising one or more pictures comprising one or more subpictures comprising one or more slices and a bitstream representation of the video according to a rule, and wherein the bitstream representation includes a number of coded units, wherein the rule specifies that a decoding order of coded units within a subpicture is in an increasing order of subpicture level slice index values of the coded units.

2. The method of claim 1, wherein the coded units correspond to video coded layer (VCL) network abstraction layer (NAL) units.

3. The method of claim 1, wherein the rule is applied in a case that a slice mode is a rectangular slice mode.

4. The method of claim 1, wherein a subpicture-level slice index value is a value of a slice_address syntax element in a slice header that specifies a slice address of a slice.

5. The method of any of claims 1 to 4, wherein a value of a slice_subpic_id parameter is inferred upon a determination that the bitstream representation excludes the slice_subpic_id parameter.

6. The method of claim 5, wherein the slice_subpic_id parameter specifies a subpicture identification (ID) of the subpicture that contains the slice.

7. The method of claim 5, wherein the value of the slice_subpic_id parameter is inferred to be equal to 0 upon the determination.

8. The method of any of claims 1-7, wherein subpicture ID values of subpictures comprising the plurality of the coded units monotonically increase with the subpicture index values of subpictures comprising the plurality of the coded units.

9. The method of any of claims 5 to 7, wherein the decoding order of the coded units within a picture including a first slice network abstraction layer (NAL) unit and a second slice NAL unit is specified such that the first slice NAL unit precedes the second slice NAL unit in a case that i) a subpicture-level slice index value of the first slice NAL unit is less than a subpicture-level slice index value of the second slice NAL unit, or ii) the subpicture-level slice index value of the first slice NAL unit is equal to the subpicture-level slice index value of the second slice NAL unit and a value of a slice_address syntax element of the first slice NAL unit is less than a value of a slice_address syntax element of the second slice NAL unit.

10. A method of video processing, comprising: performing a conversion between a video comprising one or more pictures comprising one or more subpictures comprising one or more slices and a bitstream representation of the video according to a rule, and wherein the bitstream representation includes a number of coded units, wherein the rule specifies that a decoding order of coded units is in an increasing order of subpicture related values of subpictures from the one or more subpictures that include the coded units.

11. The method of claim 10, wherein the coded units correspond to video coded layer (VCL) network abstraction layer (NAL) units.

12. The method of claim 10, wherein the rule is applied in a case that a slice mode is a rectangular slice mode.

13. The method of claim 10, wherein the subpicture related values correspond to identification (ID) values of subpictures comprising the coded units.

14. The method of claim 10, wherein the subpicture related values correspond to subpicture index values of subpictures comprising the coded units.

15. The method of any of claims 10 to 14, wherein a value of a slice_subpic_id parameter is inferred upon a determination that the bitstream representation excludes the slice_subpic_id parameter.

16. The method of claim 15, wherein the value of the slice_subpic_id parameter is inferred to be equal to 0 upon the determination.

17. The method of any of claims 10 to 16, wherein subpicture ID values of subpictures comprising the coded units monotonically increase with the subpicture index values of subpictures comprising the plurality of the coded units 18. The method of any of claims 10 to 16, wherein the conversion includes encoding the video into the bitstream representation.

19. The method of any of claims 10 to 16, wherein the conversion includes decoding the video from the bitstream representation.

20. A video processing apparatus comprising a processor configured to implement a method recited in any one or more of claims 1 to 19.

21. A computer readable medium storing program code that, when executed, causes a processor to implement a method recited in any one or more of claims 1 to 19.

22. A computer readable medium that stores a coded representation or a bitstream representation generated according to any of the above described methods.

23. A video processing apparatus for storing a bitstream representation, wherein the video processing apparatus is configured to implement a method recited in any one or more of claims 1 to 19.

While the present disclosure contains many specifics, these should not be construed as limitations on the scope of any invention or of what may be claimed, but rather as descriptions of features that may be specific to particular embodiments of particular inventions. Certain features that are described in the present disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

Only a few implementations and examples are described and other implementations, enhancements and variations can be made based on what is described and illustrated in the present disclosure.

What is claimed is:

1. A method of video processing, comprising:
performing a conversion between a video comprising one or more pictures comprising one or more subpictures comprising one or more slices and a bitstream of the video according to a rule,
wherein the bitstream includes a number of coded units,
wherein the rule specifies that a decoding order of the coded units within a subpicture is in an increasing order of values of slice_address syntax elements in slice headers that specify slice addresses of slices corresponding to the coded units, and
wherein the decoding order of coded units within a picture including a first slice network abstraction layer (NAL) unit and a second slice NAL unit is specified such that the first slice NAL unit precedes the second slice NAL unit in a case that the subpicture index value of the first slice NAL unit is equal to the subpicture index value of the second slice NAL unit and a value of a slice_address syntax element of the first slice NAL unit is less than a value of a slice_address syntax element of the second slice NAL unit.

2. The method of claim 1, wherein the coded units correspond to video coded layer (VCL) network abstraction layer (NAL) units.

3. The method of claim 1, wherein when a slice mode is a rectangular slice mode, a value of a slice_address syntax element in a slice header is equal to a subpicture-level slice index.

4. The method of claim 3, wherein the subpicture-level slice index specifies an index of a slice to a list of slices in a subpicture in an order as they are signalled in a picture parameter set.

5. The method of claim 1, wherein a value of a slice_subpic_id parameter is inferred upon a determination that the bitstream excludes the slice_subpic_id parameter, and wherein the slice_subpic_id parameter specifies a subpicture identification (ID) of a subpicture that contains a slice.

6. The method of claim 5, wherein the value of the slice_subpic_id parameter is inferred to be equal to 0 upon the determination.

7. The method of claim 1, wherein subpicture ID values of subpictures comprising the number of the coded units monotonically increase with subpicture index values of subpictures comprising the number of the coded units.

8. The method of claim 1, wherein the decoding order of coded units within the picture including the first slice NAL unit and the second slice NAL unit is specified such that the first slice NAL unit precedes the second slice NAL unit in a case that a subpicture index value of the first slice NAL unit is less than a subpicture index value of the second slice NAL unit.

9. The method of claim 1, wherein the conversion includes encoding the video into the bitstream.

10. The method of claim 1, wherein the conversion includes decoding the video from the bitstream.

11. An apparatus for processing video data comprising a processor and a non-transitory memory with instructions thereon, wherein the instructions upon execution by the processor, cause the processor to:

perform a conversion between a video comprising one or more pictures comprising one or more subpictures comprising one or more slices and a bitstream of the video according to a rule, wherein the bitstream includes a number of coded units, wherein the rule specifies that a decoding order of the coded units within a subpicture is in an increasing order of values of slice_address syntax elements in slice headers that specify slice addresses of slices corresponding to the coded units, and wherein the decoding order of coded units within a picture including a first slice network abstraction layer (NAL) unit and a second slice NAL unit is specified such that the first slice NAL unit precedes the second slice NAL unit in a case that the subpicture index value of the first slice NAL unit is equal to the subpicture index value of the second slice NAL unit and a value of a slice_address syntax element of the first slice NAL unit is less than a value of a slice_address syntax element of the second slice NAL unit.

12. The apparatus of claim 11, wherein the coded units correspond to video coded layer (VCL) network abstraction layer (NAL) units.

13. The apparatus of claim 11, wherein when a slice mode is a rectangular slice mode, a value of a slice_address syntax element in a slice header is equal to a subpicture-level slice index, and wherein the subpicture-level slice index specifies an index of a slice to a list of slices in a subpicture in an order as they are signalled in a picture parameter set.

14. The apparatus of claim 11, wherein the decoding order of coded units within the picture including the first slice NAL network abstraction layer (NAL) unit and the second slice NAL unit is specified such that the first slice NAL unit precedes the second slice NAL unit in a case that a subpicture index value of the first slice NAL unit is less than a subpicture index value of the second slice NAL unit.

15. A non-transitory computer-readable storage medium storing instructions that cause a processor to:

perform a conversion between a video comprising one or more pictures comprising one or more subpictures comprising one or more slices and a bitstream of the video according to a rule, wherein the bitstream includes a number of coded units, wherein the rule specifies that a decoding order of the coded units within a subpicture is in an increasing order of values of slice_address syntax elements in slice headers that specify slice addresses of slices corresponding to the coded units, and wherein the decoding order of coded units within a picture including a first slice network abstraction layer (NAL) unit and a second slice NAL unit is specified such that the first slice NAL unit precedes the second slice NAL unit in a case that the subpicture index value of the first slice NAL unit is equal to the subpicture index value of the second slice NAL unit and a value of a slice_address syntax element of the first slice NAL unit is less than a value of a slice_address syntax element of the second slice NAL unit.

16. The non-transitory computer-readable storage medium of claim 15, wherein when a slice mode is a rectangular slice mode, a value of a slice_address syntax element in a slice header is equal to a subpicture-level slice index, and wherein the subpicture-level slice index specifies an index of a slice to a list of slices in a subpicture in an order as they are signalled in a picture parameter set.

17. The non-transitory computer-readable storage medium of claim 15, wherein the decoding order of coded units within the picture including the first slice NAL unit and the second slice NAL unit is specified such that the first slice NAL unit precedes the second slice NAL unit in a case that a subpicture index value of the first slice NAL unit is less than a subpicture index value of the second slice NAL unit.

18. A non-transitory computer-readable recording medium storing a bitstream of a video which is generated by a method performed by a video processing apparatus, wherein the method comprises:

generating the bitstream of the video comprising one or more pictures comprising one or more subpictures comprising one or more slices according to a rule, wherein the bitstream includes a number of coded units, wherein the rule specifies that a decoding order of the coded units within a subpicture is in an increasing order of values of slice_address syntax elements in slice headers that specify slice addresses of slices corresponding to the coded units, and wherein the decoding order of coded units within a picture including a first slice network abstraction layer (NAL) unit and a second slice NAL unit is specified such that the first slice NAL unit precedes the second slice NAL unit in a case that the subpicture index value of the first slice NAL unit is equal to the subpicture index value of the second slice NAL unit and a value of a slice_address syntax element of the first slice NAL unit is less than a value of a slice_address syntax element of the second slice NAL unit.

19. The non-transitory computer-readable recording medium of claim 18, wherein when a slice mode is a rectangular slice mode, a value of a slice_address syntax element in a slice header is equal to a subpicture-level slice index, and wherein the subpicture-level slice index specifies an index of a slice to a list of slices in a subpicture in an order as they are signalled in a picture parameter set.

20. The non-transitory computer-readable recording medium of claim 18, wherein the decoding order of coded units within the picture including the first slice NAL unit and the second slice NAL unit is specified such that the first slice NAL unit precedes the second slice NAL unit in a case that a subpicture index value of the first slice NAL unit is less than a subpicture index value of the second slice NAL unit.

* * * * *